United States Patent
Horiuchi

(10) Patent No.: US 9,531,217 B2
(45) Date of Patent: Dec. 27, 2016

(54) POWER RECEPTION DEVICE, POWER TRANSMISSION DEVICE AND POWER TRANSFER SYSTEM

(75) Inventor: Satoru Horiuchi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 559 days.

(21) Appl. No.: 14/124,120

(22) PCT Filed: Jun. 27, 2011

(86) PCT No.: PCT/JP2011/064636
§ 371 (c)(1),
(2), (4) Date: Dec. 5, 2013

(87) PCT Pub. No.: WO2013/001586
PCT Pub. Date: Jan. 3, 2013

(65) Prior Publication Data
US 2014/0111002 A1    Apr. 24, 2014

(51) Int. Cl.
*B60L 1/00*    (2006.01)
*B60L 3/00*    (2006.01)
(Continued)

(52) U.S. Cl.
CPC ............. *H02J 17/00* (2013.01); *B60L 11/123* (2013.01); *B60L 11/14* (2013.01); *B60L 11/182* (2013.01); *B60L 11/1833* (2013.01); *H01F 27/30* (2013.01); *H01F 38/14* (2013.01); *B60L 2210/10* (2013.01); *B60L 2210/30* (2013.01); *B60L 2210/40* (2013.01); *B60L 2240/36* (2013.01); *Y02T 10/6217* (2013.01); *Y02T 10/7005* (2013.01); *Y02T 10/7072* (2013.01);
(Continued)

(58) Field of Classification Search
CPC ............. H02J 5/005; H02J 7/025; H02J 17/00; H02J 50/00
USPC ................................................ 307/9.1, 104
See application file for complete search history.

(56) References Cited

U.S. PATENT DOCUMENTS 5,821,731 A * 10/1998 Kuki .................. B60L 11/1805
                                                     320/108
7,741,734 B2    6/2010 Joannopoulos et al.
(Continued)

FOREIGN PATENT DOCUMENTS

AU    2006269374 B2    1/2007
AU    2006269374 C1    1/2007
(Continued)

OTHER PUBLICATIONS

Sep. 2, 2014 partial translation of Office Action issued in Japanese Patent Application No. 2013-522378.

Primary Examiner — Carlos Amaya
(74) Attorney, Agent, or Firm — Oliff PLC

(57) ABSTRACT

A power reception device includes: a vehicle-side resonant portion mounted on a vehicle and resonating, through an electromagnetic field, with a facility-side resonant portion provided in an external facility; and a vehicle-side support including a first support member supporting the vehicle-side resonant portion, and a second support member spaced apart from the vehicle-side resonant portion and supporting the first support member, wherein a dielectric tangent of the first support member is smaller than a dielectric tangent of the second support member.

19 Claims, 22 Drawing Sheets

(51) Int. Cl.
   *H02G 3/00*    (2006.01)
   *H02J 17/00*   (2006.01)
   *H01F 38/14*   (2006.01)
   *H01F 27/30*   (2006.01)
   *B60L 11/18*   (2006.01)
   *B60L 11/12*   (2006.01)
   *B60L 11/14*   (2006.01)

(52) U.S. Cl.
   CPC ........ *Y02T 10/7077* (2013.01); *Y02T 10/7216* (2013.01); *Y02T 10/7241* (2013.01); *Y02T 90/12* (2013.01); *Y02T 90/121* (2013.01); *Y02T 90/122* (2013.01); *Y02T 90/125* (2013.01); *Y02T 90/127* (2013.01); *Y02T 90/14* (2013.01)

(56) References Cited

U.S. PATENT DOCUMENTS

| | | |
|---|---|---|
| 2007/0222542 A1 | 9/2007 | Joannopoulos et al. |
| 2008/0278264 A1 | 11/2008 | Karalis et al. |
| 2009/0195332 A1 | 8/2009 | Joannopoulos et al. |
| 2009/0195333 A1 | 8/2009 | Joannopoulos et al. |
| 2009/0224856 A1 | 9/2009 | Karalis et al. |
| 2009/0267709 A1 | 10/2009 | Joannopoulos et al. |
| 2009/0267710 A1 | 10/2009 | Joannopoulos et al. |
| 2010/0096934 A1 | 4/2010 | Joannopoulos et al. |
| 2010/0102639 A1 | 4/2010 | Joannopoulos et al. |
| 2010/0102640 A1 | 4/2010 | Joannopoulos et al. |
| 2010/0102641 A1 | 4/2010 | Joannopoulos et al. |
| 2010/0117455 A1 | 5/2010 | Joannopoulos et al. |
| 2010/0117456 A1 | 5/2010 | Karalis et al. |
| 2010/0123353 A1 | 5/2010 | Joannopoulos et al. |
| 2010/0123354 A1 | 5/2010 | Joannopoulos et al. |
| 2010/0123355 A1 | 5/2010 | Joannopoulos et al. |
| 2010/0127573 A1 | 5/2010 | Joannopoulos et al. |
| 2010/0127574 A1 | 5/2010 | Joannopoulos et al. |
| 2010/0127575 A1 | 5/2010 | Joannopoulos et al. |
| 2010/0133918 A1 | 6/2010 | Joannopoulos et al. |
| 2010/0133919 A1 | 6/2010 | Joannopoulos et al. |
| 2010/0133920 A1 | 6/2010 | Joannopoulos et al. |
| 2010/0171370 A1 | 7/2010 | Karalis et al. |
| 2010/0181844 A1 | 7/2010 | Karalis et al. |
| 2010/0187911 A1 | 7/2010 | Joannopoulos et al. |
| 2010/0201205 A1 | 8/2010 | Karalis et al. |
| 2010/0207458 A1 | 8/2010 | Joannopoulos et al. |
| 2010/0225175 A1 | 9/2010 | Karalis et al. |
| 2010/0231053 A1 | 9/2010 | Karalis et al. |
| 2010/0237706 A1 | 9/2010 | Karalis et al. |
| 2010/0237707 A1 | 9/2010 | Karalis et al. |
| 2010/0237708 A1 | 9/2010 | Karalis et al. |
| 2010/0253152 A1 | 10/2010 | Karalis et al. |
| 2010/0264745 A1 | 10/2010 | Karalis et al. |
| 2014/0055089 A1 | 2/2014 | Ichikawa et al. |

FOREIGN PATENT DOCUMENTS

| | | |
|---|---|---|
| AU | 2007349874 A2 | 10/2008 |
| AU | 2010200044 A1 | 1/2010 |
| CA | 2 615 123 A1 | 1/2007 |
| CA | 2 682 284 A1 | 10/2008 |
| CN | 101258658 A | 9/2008 |
| CN | 101682216 A | 3/2010 |
| CN | 101860089 A | 10/2010 |
| CN | 103534771 A | 1/2014 |
| EP | 1 902 505 A2 | 3/2008 |
| EP | 2 130 287 A1 | 12/2009 |
| EP | 2711945 A1 | 3/2014 |
| IN | 735/DELNP/2008 | 5/2008 |
| IN | 6195/DELNP/2009 | 7/2010 |
| JP | A-4-79206 | 3/1992 |
| JP | A-4-186811 | 7/1992 |
| JP | A-2009-501510 | 1/2009 |
| JP | A-2010-87353 | 4/2010 |
| JP | A 2010-268660 | 11/2010 |
| JP | A 2011-204836 | 10/2011 |
| KR | 2008-0031398 A | 4/2008 |
| KR | 2010-0015954 A | 2/2010 |
| WO | WO 2007/008646 A2 | 1/2007 |
| WO | WO 2008/118178 A1 | 10/2008 |
| WO | WO 2011/117714 A2 | 9/2011 |

\* cited by examiner

POWER RECEPTION DEVICE, POWER TRANSMISSION DEVICE AND POWER TRANSFER SYSTEM

TECHNICAL FIELD

The present invention relates to a power reception device, a power transmission device and a power transfer system.

BACKGROUND ART

In recent years, in consideration of the environment, attention has been focused on a hybrid vehicle, an electric vehicle or the like that uses electric power from a battery and the like to drive a driving wheel.

Particularly, attention has been focused in recent years on wireless charging by which the battery can be charged in a contactless manner without using a plug and the like in the aforementioned electrically powered vehicle having the battery mounted thereon. Various types of contactless charging methods have been suggested recently, and the technique of using the resonance phenomenon to transfer electric power in a contactless manner has been particularly in the spotlight.

For example, a noncontact power transmission device described in Japanese Patent Laying-Open No. 2010-268660 includes a resonator, and this resonator includes a self-resonant coil and a bobbin having an outer circumferential surface to which the self-resonant coil is attached.

CITATION LIST

Patent Document

PTD 1: Japanese Patent Laying-Open No. 2010-268660

SUMMARY OF INVENTION

Technical Problem

The self-resonant coil described in Japanese Patent Laying-Open No. 2010-268660 is directly attached to the outer circumferential surface of the bobbin. Therefore, when a high-frequency and high-voltage current flows through the self-resonant coil during power transfer, a large dielectric loss occurs in a contact portion between the bobbin and the self-resonant coil. As a result, the power transfer efficiency may be reduced.

The present invention has been made in view of the aforementioned problems and an object thereof is to provide a power reception device, a power transmission device and a power transfer system with reduced dielectric loss and enhanced power transfer efficiency.

Solution to Problem

A power reception device according to the present invention includes: a vehicle-side resonant portion mounted on a vehicle and resonating, through an electromagnetic field, with a facility-side resonant portion provided in an external facility; and a vehicle-side support including a first support member supporting the vehicle-side resonant portion, and a second support member spaced apart from the vehicle-side resonant portion and supporting the first support member. A dielectric tangent of the first support member is smaller than a dielectric tangent of the second support member.

Preferably, the vehicle-side resonant portion includes a first resonant coil formed by winding a first coil wire. The second support member includes a circumferential surface extending along the first resonant coil. The first support member includes a plurality of vehicle-side support pieces provided on the circumferential surface of the second support member, spaced apart from one another in a length direction of the first coil wire, and supporting the first resonant coil.

Preferably, the first resonant coil includes an intermediate region including a central portion in the length direction of the first coil wire and a portion located around the central portion as well as an end region including an end of the first coil wire and a portion located around the end. The first support member includes a first support piece supporting a portion of the first resonant coil located in the intermediate region, and a second support piece supporting a portion of the first resonant coil located in the end region. A contact area between the first support piece and the first resonant coil is smaller than a contact area between the second support piece and the first resonant coil.

Preferably, the second support member is cylindrically formed. The power reception device further includes: a first path forming member made of resin, spaced apart from the first resonant coil, and forming a first cooling medium flow path for cooling the first resonant coil between the first path forming member and the circumferential surface of the second support member; and a cooling medium supply device for supplying a cooling medium to the first cooling medium flow path. A thickness of the first path forming member is smaller than a thickness of the second support member.

Preferably, the vehicle-side support pieces are removably provided at the second support member.

Preferably, a distance between the first path forming member and the first resonant coil is shorter than a distance between the second support member and the first resonant coil.

Preferably, the vehicle-side resonant portion includes a first resonant coil formed by winding a first coil wire. The second support member includes a circumferential surface extending along the first resonant coil. The power reception device further includes: a first electromagnetic induction coil extending along the circumferential surface of the second support member, spaced apart from the first resonant coil, and being capable of receiving electric power from the first resonant coil by electromagnetic induction; and a third support member provided on the circumferential surface of the second support member and supporting the first electromagnetic induction coil. One of the first support member and the third support member is provided to be relatively movable with respect to the other such that a spacing between the first resonant coil and the first electromagnetic induction coil can be adjusted. Preferably, the first support member is made of fluorine resin.

Preferably, the vehicle-side resonant portion includes a first resonant coil formed by winding a first coil wire, and the second support member is cylindrically formed and includes an inner circumferential surface extending along the first resonant coil. The first resonant coil is arranged on the inner circumferential surface side of the second support member.

A power transmission device according to the present invention includes: a facility-side resonant portion resonating, through an electromagnetic field, with a vehicle-side resonant portion mounted on a vehicle; and a facility-side support including a fourth support member supporting the facility-side resonant portion, and a fifth support member spaced apart from the facility-side resonant portion and supporting the fourth support member. A dielectric tangent of the fourth support member is smaller than a dielectric tangent of the fifth support member.

Preferably, the facility-side resonant portion includes a second resonant coil formed by winding a second coil wire, and the fifth support member includes a circumferential surface extending along the second resonant coil. The fourth support member includes a plurality of facility-side support pieces provided on the circumferential surface of the fifth support member, spaced apart from one another in a length direction of the second coil wire, and supporting the second resonant coil.

Preferably, the second resonant coil includes an intermediate region including a central portion in the length direction of the second coil wire and a portion located around the central portion as well as an end region including an end of the second coil wire and a portion located around the end. The fourth support member includes a third support piece supporting a portion of the second resonant coil located in the intermediate region, and a fourth support piece supporting a portion of the second resonant coil located in the end region. A contact area between the third support piece and the second resonant coil is smaller than a contact area between the fourth support piece and the second resonant coil.

Preferably, the fifth support member is cylindrically formed. Preferably, the power transmission device further includes: a second path forming member made of resin, spaced apart from the second resonant coil, and forming a second cooling medium flow path for cooling the second resonant coil between the second path forming member and the circumferential surface of the fifth support member; and a cooling medium supply device for supplying a cooling medium to the second cooling medium flow path. A thickness of the second path forming member is smaller than a thickness of the fifth support member.

Preferably, the facility-side support pieces are removably provided at the fifth support member.

Preferably, a distance between the second path forming member and the second resonant coil is shorter than a distance between the fifth support member and the second resonant coil.

Preferably, the facility-side resonant portion includes a second resonant coil formed by winding a second coil wire. The fifth support member includes a circumferential surface extending along the second resonant coil. The power transmission device further includes: a second electromagnetic induction coil extending along the circumferential surface of the fifth support member, spaced apart from the second resonant coil, and being capable of receiving electric power from the second resonant coil by electromagnetic induction; and a sixth support member provided on the circumferential surface of the fifth support member and supporting the second electromagnetic induction coil. One of the fourth support member and the sixth support member is provided to be relatively movable with respect to the other such that a spacing between the second resonant coil and the second electromagnetic induction coil can be adjusted. Preferably, the fourth support member is made of fluorine resin.

Preferably, the facility-side resonant portion includes a second resonant coil formed by winding a second coil wire. The fifth support member is cylindrically formed and includes an inner circumferential surface extending along the second resonant coil. The second resonant coil is arranged on the inner circumferential surface side of the fifth support member.

A power transfer system according to the present invention includes: a power transmission device including a facility-side resonant portion provided in a facility external to a vehicle, and a facility-side support supporting the facility-side resonant portion; and a power reception device including a vehicle-side resonant portion mounted on the vehicle and resonating with the facility-side resonant portion through an electromagnetic field, and a vehicle-side support supporting the vehicle-side resonant portion. The vehicle-side support includes a first support member supporting the vehicle-side resonant portion, and a second support member spaced apart from the vehicle-side resonant portion and supporting the first support member. The facility-side support includes a fourth support member supporting the facility-side resonant portion, and a fifth support member spaced apart from the facility-side resonant portion and supporting the fourth support member. A dielectric tangent of the first support member is smaller than a dielectric tangent of the second support member. A dielectric tangent of the fourth support member is smaller than a dielectric tangent of the fifth support member.

Advantageous Effects of Invention

In the power reception device, the power transmission device and the power transfer system according to the present invention, the dielectric loss can be reduced and the power transfer efficiency can be enhanced.

DESCRIPTION OF EMBODIMENTS

When the number, amount, etc. are referred to in the embodiments described below, the scope of the present invention is not necessarily limited to that number, amount, etc. unless otherwise specified. In the following embodiments, each component is not necessarily essential to the present invention unless otherwise specified. When a plurality of embodiments are provided below, it is initially intended that the features of the embodiments can be combined as appropriate, unless otherwise specified.

First Embodiment

Figure 1:
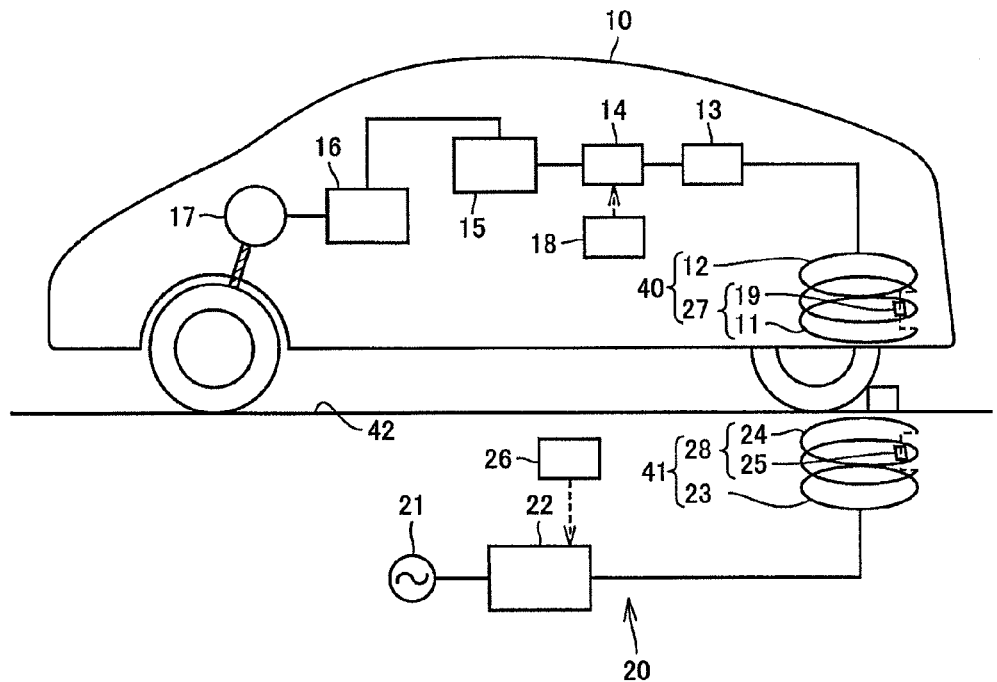
FIG. 1 is a schematic view schematically showing a power reception device, a power transmission device and a power transfer system according to a first embodiment.

A power reception device, a power transmission device, and a power transfer system including these power transmission device and power reception device according to a first embodiment of the present invention will be described with reference to FIGS. 1 to 17. FIG. 1 is a schematic view schematically showing the power reception device, the power transmission device and the power transfer system according to the first embodiment.

The power transfer system according to the first embodiment has an electrically powered vehicle 10 including a power reception device 40, and an external power feeding apparatus 20 including a power transmission device 41. When electrically powered vehicle 10 stops at a prescribed position in a parking space 42 where power transmission device 41 is provided, power reception device 40 of electrically powered vehicle 10 mainly receives electric power from power transmission device 41.

Parking space 42 is provided with a wheel block and a line for causing electrically powered vehicle 10 to stop at the prescribed position.

External power feeding apparatus 20 includes a high-frequency power driver 22 connected to an AC power supply 21, a control unit 26 for controlling driving of high-frequency power driver 22 and the like, and power transmission device 41 connected to high-frequency power driver 22. Power transmission device 41 includes a power transmission-side resonant portion 28 and an electromagnetic induction coil 23. Power transmission-side resonant portion 28 includes a resonant coil 24 and a capacitor 25 connected to resonant coil 24. Electromagnetic induction coil 23 is electrically connected to high-frequency power driver 22. Although capacitor 25 is provided in this example shown in FIG. 1, capacitor 25 is not necessarily essential.

AC power supply 21 is a power supply external to the vehicle, and for example, a system power supply. High-frequency power driver 22 converts electric power received from AC power supply 21 into high-frequency electric power and supplies the converted high-frequency electric power to electromagnetic induction coil 23. It is to be noted that the high-frequency electric power generated by high-frequency power driver 22 has a frequency of, for example, 1 MHz to several tens of MHz.

Supply of the aforementioned high-frequency electric power to electromagnetic induction coil 23 results in change over time in an amount of magnetic flux generated from electromagnetic induction coil 23.

Resonant coil 24 is electromagnetic inductively coupled to electromagnetic induction coil 23. As a result of the change in the amount of magnetic flux generated from resonant coil 23, a high-frequency current flows through resonant coil 24 as well due to electromagnetic induction.

At this time, the current is supplied to electromagnetic induction coil 23 such that a frequency of the high-frequency current flowing through resonant coil 24 substantially matches a resonance frequency determined by a reluctance of resonant coil 24 and a capacitance of capacitor 25 and a self capacitance of resonant coil 24. Resonant coil 24 and capacitor 25 function as a serial LC resonator (resonant portion).

Then, an electric field and a magnetic field having a frequency that is substantially the same as the resonance frequency are formed around resonant coil 24. In this way, an electromagnetic field having a prescribed frequency is formed around resonant coil 24.

Electrically powered vehicle 10 includes power reception device 40, a rectifier 13 connected to power reception device 40, a DC/DC converter 14 connected to rectifier 13, a battery 15 connected to DC/DC converter 14, a power control unit (PCU) 16, a motor unit 17 connected to power control unit 16, and a vehicle ECU (Electronic Control Unit) 18 for controlling driving of DC/DC converter 14, power control unit 16 and the like.

Although electrically powered vehicle 10 according to the present embodiment is a hybrid vehicle including a not-shown engine, electrically powered vehicle 10 may also be an electric vehicle or a fuel cell vehicle as long as it is driven by a motor.

Power reception device 40 includes a power reception-side resonant portion 27 and an electromagnetic induction coil 12, and power reception-side resonant portion 27 includes a resonant coil 11 and a capacitor 19. Power reception-side resonant portion 27 is a serial LC resonator formed by resonant coil 11 and capacitor 19. A resonance frequency of power reception-side resonant portion 27 substantially matches a resonance frequency of power transmission-side resonant portion 28.

The alternating current having a frequency that is the same as the resonance frequency flows through power transmission-side resonant portion 28, and thereby the electromagnetic field is formed around resonant coil 24 of power transmission-side resonant portion 28. Since resonant coil 11 is arranged within a prescribed range from resonant coil 24, the current flows through resonant coil 11 by the aforementioned electromagnetic field.

Since the resonance frequency of power transmission-side resonant portion 28 substantially matches the resonance frequency of power reception-side resonant portion 27, the electric power is excellently supplied to resonant coil 11. As described above, power reception-side resonant portion 27 and power transmission-side resonant portion 28 resonate with each other through the electromagnetic field, and resonant coil 11 receives the electric power. It is to be noted that resonant coil 11 is arranged within a near field (evanescent field) of the electromagnetic field formed around resonant coil 24, and receives the electric power efficiently. Details of a wireless power transmission and power reception method using this electromagnetic resonance method will be described below.

Electromagnetic induction coil 12 is electromagnetic inductively coupled to resonant coil 11 and takes out the electric power received by resonant coil 11. Electromagnetic induction coil 12 takes out the electric power from resonant coil 11 continuously, and thereby the electric power is continuously supplied from resonant coil 24 to resonant coil 11 through the electromagnetic field. As described above, the wireless power transmission and power reception method using the so-called electromagnetic resonance method is employed between power reception device 40 and power transmission device 41.

Rectifier 13 is connected to electromagnetic induction coil 12, and converts the alternating current supplied from electromagnetic induction coil 12 into a direct current and supplies the direct current to DC/DC converter 14.

DC/DC converter 14 adjusts a voltage of the direct current supplied from rectifier 13 and supplies the direct current to battery 15. It is to be noted that DC/DC converter 14 is not essential and may be omitted. In this case, external power feeding apparatus 20 is provided with a matching device for matching an impedance, which can be used in place of DC/DC converter 14.

Power control unit 16 includes a converter connected to battery 15 and an inverter connected to this converter. The converter adjusts (boosts) the direct current supplied from battery 15 and supplies the direct current to the inverter. The inverter converts the direct current supplied from the converter into an alternating current and supplies the alternating current to motor unit 17.

A three-phase AC motor or the like is, for example, used as motor unit 17, and motor unit 17 is driven by the alternating current supplied from the inverter of power control unit 16.

When electrically powered vehicle 10 is a hybrid vehicle, electrically powered vehicle 10 further includes an engine and a power split device, and motor unit 17 includes a motor generator that functions mainly as a generator, and a motor generator that functions mainly as a motor.

As described above, the wireless power transmission and power reception method using the resonance method through the electromagnetic field is employed between power reception device 40 and power transmission device 41 according to the first embodiment, and power transmission device 41 and power reception device 40 resonate with each other through the electromagnetic field. "Resonate through the electromagnetic field" herein refers to a concept including both resonance through the magnetic field and resonance through the electric field. Although an example in which power reception device 40 and power transmission device 41 resonate with each other mainly through the magnetic field is described in the present embodiment, the present invention also includes resonance through the electric field, of course.

Figure 2:
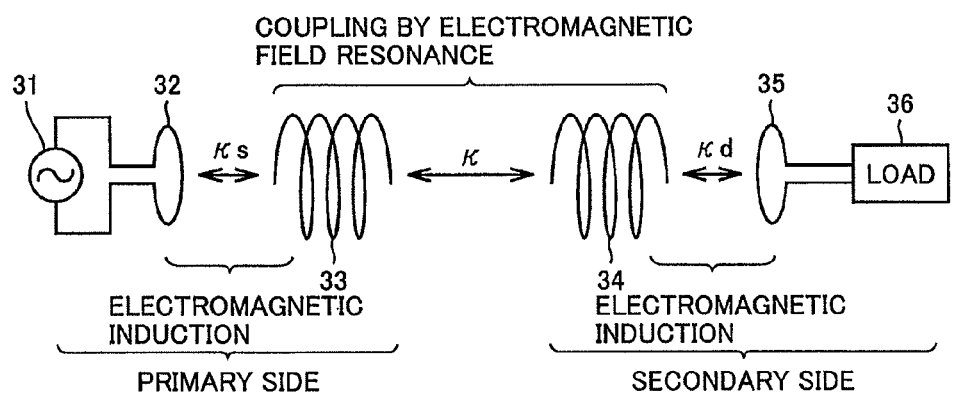
FIG. 2 is a schematic view for describing the principle of power transmission and power reception by a resonance method, and the principle of power transmission and power reception by the resonance method will be described with reference to this FIG. 2.

FIG. 2 is a schematic view for describing the principle of power transmission and power reception by the resonance method, and the principle of power transmission and power reception by the resonance method will be described with reference to this FIG. 2.

Referring to FIG. 2, according to this resonance method, as in the case where two tuning forks resonate with each other, two LC resonant coils having the same natural frequency resonate with each other in the electromagnetic field (near field), which causes the electric power to be transferred from one of the coils to the other of the coils through the electromagnetic field.

Specifically, a primary coil 32 is connected to a high-frequency power supply 31 to supply the electric power having a high-frequency of 1 MHz to several tens of MHz to a primary resonant coil 33 magnetically coupled to primary coil 32 by electromagnetic induction. Primary resonant coil 33 is a serial LC resonator consisting of an inductance and a stray capacitance of the coil itself (including a capacitance of a capacitor when the capacitor is connected to the coil), and resonates through the electromagnetic field (near field) with a secondary resonant coil 34 having the same resonance frequency as that of primary resonant coil 33. This causes the energy (electric power) to be transferred from primary resonant coil 33 through the electromagnetic field to secondary resonant coil 34. The energy (electric power) transferred to secondary resonant coil 34 is taken out by a secondary coil 35 magnetically coupled to secondary resonant coil 34 by electromagnetic induction, and supplied to a load 36. It is to be noted that the power transmission by the resonance method is implemented when a Q value showing the intensity of the resonance between primary resonant coil 33 and secondary resonant coil 34 is greater than, for example, 100.

The correspondence relationship between the configuration shown in FIG. 2 and the configuration shown in FIG. 1 will now be described. AC power supply 21 and high-frequency power driver 22 shown in FIG. 1 correspond to high-frequency power supply 31 shown in FIG. 2. In addition, electromagnetic induction coil 23 shown in FIG. 1 corresponds to primary coil 32 shown in FIG. 2. Furthermore, resonant coil 24 and capacitor 25 shown in FIG. 1 correspond to primary resonant coil 33 and the stray capacitance of primary resonant coil 33 shown in FIG. 2, respectively.

Resonant coil 11 and capacitor 19 shown in FIG. 1 correspond to secondary resonant coil 34 and the stray capacitance of secondary resonant coil 34 shown in FIG. 2, respectively.

Electromagnetic induction coil 12 shown in FIG. 1 corresponds to secondary coil 35 shown in FIG. 2. Rectifier 13, DC/DC converter 14 and battery 15 shown in FIG. 1 correspond to load 36 shown in FIG. 2, respectively.

Furthermore, in the wireless power transmission and power reception method according to the first embodiment, the power transmission and power reception efficiency is enhanced by using the near field (evanescent field) where "electrostatic field" of the electromagnetic field is dominant.

Figure 3:
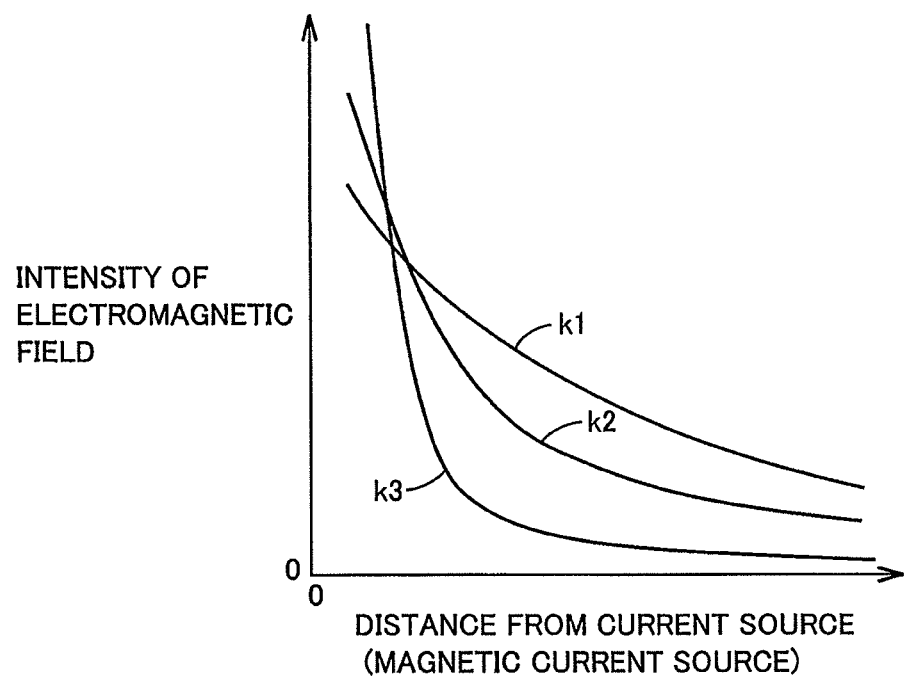
FIG. 3 is a diagram showing the relationship between the distance from a current source (a magnetic current source) and the intensity of the electromagnetic field.

FIG. 3 is a diagram showing the relationship between the distance from a current source (a magnetic current source) and the intensity of the electromagnetic field. Referring to FIG. 3, the electromagnetic field includes three components. A curve k1 represents a component inversely proportional to the distance from the wave source and is referred to as "radiation electric field". A curve k2 represents a component inversely proportional to the square of the distance from the wave source and is referred to as "induction electric field". Furthermore, a curve k3 represents a component inversely proportional to the cube of the distance from the wave source and is referred to as "electrostatic field".

"Electrostatic field" is a region where the intensity of the electromagnetic wave sharply decreases in accordance with the distance from the wave source. In the resonance method, the near field (evanescent field) where this "electrostatic field" is dominant is used to transfer the energy (electric power). In other words, in the near field where "electrostatic field" is dominant, a pair of resonators (for example, a pair of LC resonant coils) having the same natural frequency resonate with each other, to thereby transfer the energy (electric power) from one of the resonators (primary resonant coil) to the other of the resonators (secondary resonant coil). This "electrostatic field" does not allow propagation of the energy over a long distance. Accordingly, as compared to the electromagnetic wave carrying the energy (electric power) by the "radiation electric field" allowing propagation of the energy over a long distance, the resonance method allows power transmission with reduced energy loss.

As described above, as for electrically powered vehicle 10 and external power feeding apparatus 20 according to the first embodiment, resonance in the near field of the electromagnetic field is used for power transmission and power reception between power reception device 40 of electrically powered vehicle 10 and power transmission device 41 of external power feeding apparatus 20.

Figure 4:
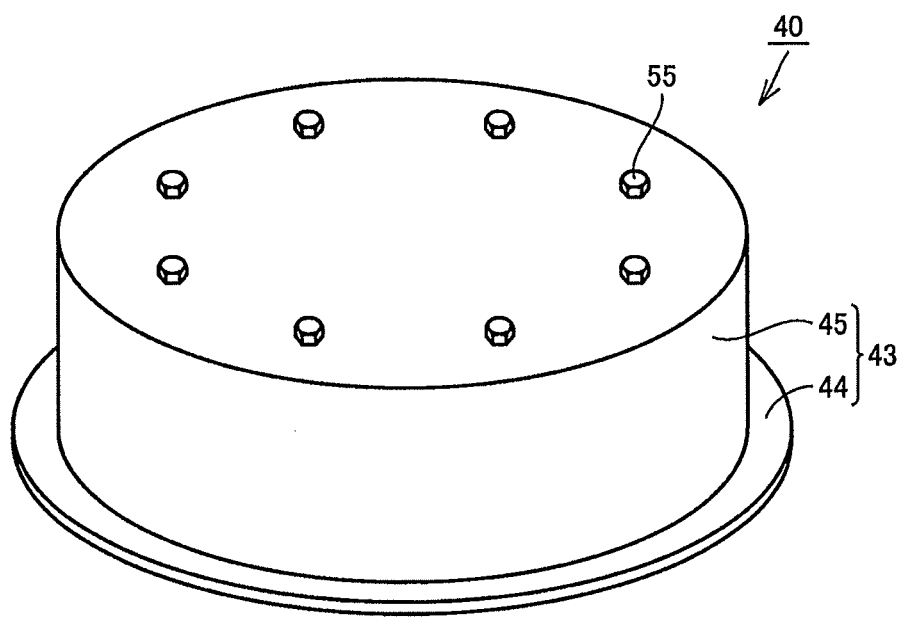
FIG. 4 is a perspective view showing a power reception device 40.
Figure 5:
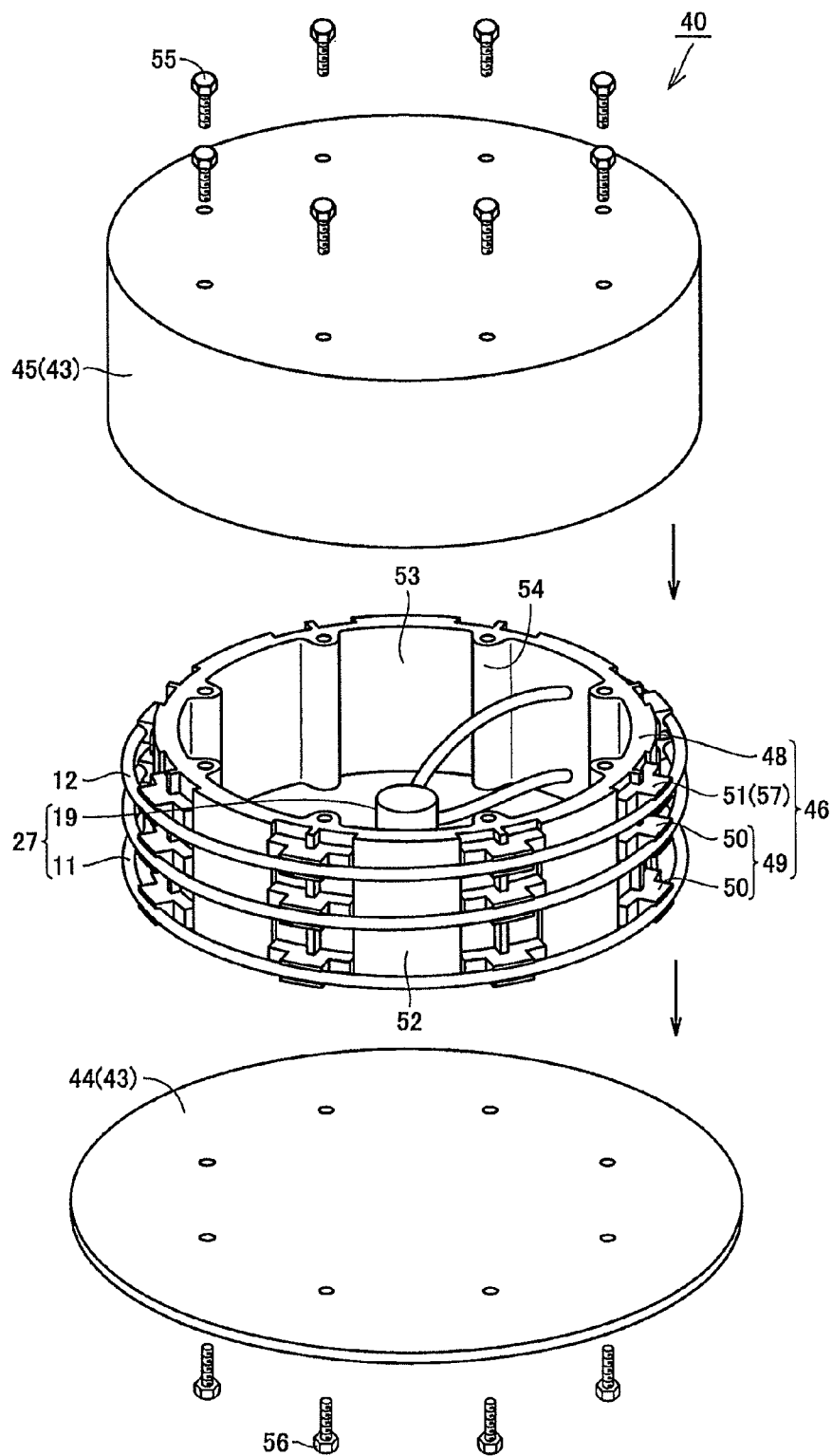
FIG. 5 is an exploded perspective view of power reception device 40 shown in FIG. 4.

FIG. 4 is a perspective view showing power reception device 40, and FIG. 5 is an exploded perspective view of power reception device 40 shown in FIG. 4. As shown in FIGS. 4 and 5, power reception device 40 includes a housing 43, power reception-side resonant portion 27, electromagnetic induction coil 12, and a support 46 that supports power reception-side resonant portion 27.

Housing 43 includes a shield 45 formed such that a bottom thereof is open, and a lid portion 44 formed to close the opening of shield 45.

Shield 45 is made of a metal material such as copper and suppresses wide leakage of the electromagnetic field framed around resonant coil 11. Lid portion 44 is made of, for example, a resin material.

Power reception-side resonant portion 27 includes resonant coil 11 and capacitor 19 connected to opposing ends of this resonant coil 11. Resonant coil 11 is formed by winding a coil wire. Although resonant coil 11 is formed to be a coil of one or more windings in the present embodiment, the coil wire may be a coil wire of single winding. Capacitor 19 is connected to the opposing ends of resonant coil 11 by a wiring.

Electromagnetic induction coil 12 is formed by winding a coil wire, and electromagnetic induction coil 12 receives electric power from resonant coil 11 by electromagnetic induction.

Support 46 includes a coil support member 49 that supports resonant coil 11, a coil support member 57 that supports electromagnetic induction coil 12, and a cylindrically-formed foundation portion 48. Foundation portion 48 functions as a support member that supports coil support member 57 and coil support member 49.

Foundation portion 48 includes an inner circumferential surface 53 and an outer circumferential surface 52 extending along resonant coil 11. A plurality of bushes 54 spaced apart from one another in the circumferential direction of inner circumferential surface 53 are formed on inner circumferential surface 53. Bush 54 is provided with a screw hole.

Bush 54 is formed to extend from one opening edge to the other opening edge of foundation portion 48 and the screw holes are formed at opposing ends of bush 54.

A bolt 55 is attached to an upper end of each bush 54, and shield 45 and foundation portion 48 are fixed by this bolt 55. A bolt 56 is attached to a lower end of each bush 54, and lid portion 44 and foundation portion 48 are fixed by this bolt 56. Capacitor 19 is arranged inside cylindrically-formed foundation portion 48.

Outer circumferential surface 52 of foundation portion 48 is formed to extend along resonant coil 11 and electromagnetic induction coil 12. The wiring connecting the ends of resonant coil 11 and capacitor 19 is connected to the ends of resonant coil 11. The wiring is formed to extend from outer circumferential surface 52 to inner circumferential surface 53 of foundation portion 48 through foundation portion 48.

On the other hand, resonant coil 11 is spaced apart from foundation portion 48 by coil support member 49. Similarly, electromagnetic induction coil 12 is also spaced apart from foundation portion 48 by coil support member 57.

In the present embodiment, a circular coil is used as resonant coil 11 and electromagnetic induction coil 12, and thus, foundation portion 48 is also cylindrically formed. Resonant coil 11 and electromagnetic induction coil 12 are not limited to the circular coil and coils having various shapes can be used as appropriate. It is needless to say that the shape of foundation portion 48 may also be changed accordingly.

Coil support member 49 includes a plurality of support pieces 50 provided on outer circumferential surface 52 of foundation portion 48. Support pieces 50 are spaced apart from one another in the extending direction of resonant coil 11.

A gap is formed between resonant coil 11 supported by the plurality of support pieces 50 and outer circumferential surface 52 of foundation portion 48, and resonant coil 11 is spaced apart from outer circumferential surface 52.

Coil support member 57 includes a plurality of support' pieces 51 provided on outer circumferential surface 52 of foundation portion 48 and supporting electromagnetic induction coil 12. Electromagnetic induction coil 12 is supported by the plurality of support pieces 51, and thereby electromagnetic induction coil 12 is spaced apart from outer circumferential surface 52.

Foundation portion 48, support piece 50 and support piece 51 are all made of a resin material, and a dielectric tangent of the resin forming support piece 50 and support piece 51 is smaller than a dielectric tangent of the resin forming foundation portion 48. The dielectric tangent contact can be measured, for example, by a bridge method or a resonance method.

Foundation portion 48 is made of, for example, urethane, ABS resin (thermoplastic resin made up of three components of acrylonitrile, butadiene and styrene), FRP resin and the like. The FRP resin can be obtained by curing an epoxy resin or a polyester resin with glass fiber or carbon cloth.

Support piece 50 is made of, for example, fluorine resin such as Teflon (registered trademark), PP (polypropylene), SPS ceramics and the like. The SPS ceramics are refractory ceramics obtained by a spark plasma sintering (SPS) method. Support piece 51 is made of the same material as that of support piece 50.

Since the dielectric tangent of support piece 50 is small, a dielectric loss that occurs at a contact portion between support piece 50 and resonant coil 11 when a current flows through resonant coil 11 can be reduced.

Since the dielectric tangent of support piece 51 is also kept to be small, a dielectric loss that occurs at a contact portion between support piece 51 and electromagnetic induction coil 12 can be reduced.

Since foundation portion 48 is spaced apart from resonant coil 11 and electromagnetic induction coil 12, a dielectric loss that occurs at foundation portion 48 can be reduced. Furthermore, since foundation portion 48 and support pieces 50 and 51 are made of different resin materials and foundation portion 48 is made of a material having a comparatively high dielectric tangent, the manufacturing cost of foundation portion 48 can be reduced.

Figure 6:
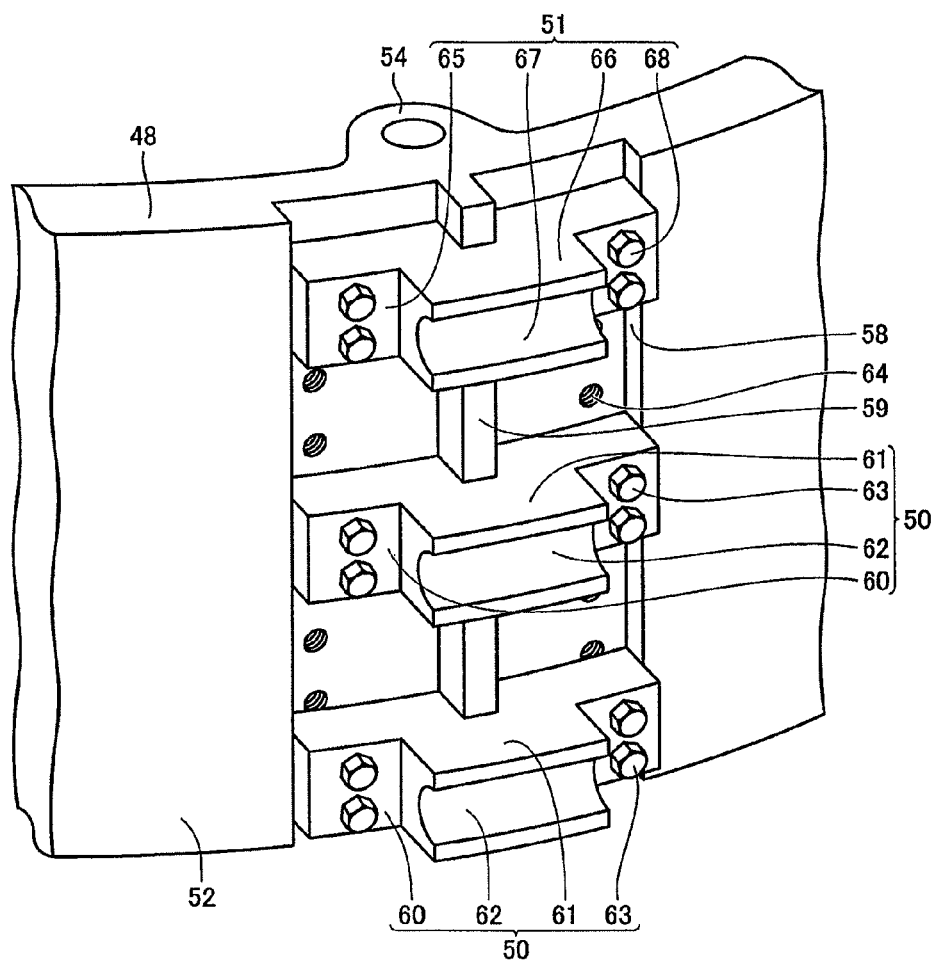
FIG. 6 is a perspective view showing a support piece 50 and a support piece 51 as well as a structure therearound.

FIG. 6 is a perspective view showing support piece 50 and support piece 51 as well as a structure thereabout. As shown in this FIG. 6, a groove portion 58 extending in the height direction is formed in outer circumferential surface 52 of foundation portion 48, and a protruding portion 59 is formed at a central portion of this groove portion 58 in the width direction.

Support piece 50 includes a base portion 60 attached to groove portion 58 and extending in the circumferential direction of outer circumferential surface 52, a projecting portion 61 formed to protrude outwardly from this base portion 60, a groove portion 62 formed at a tip of projecting portion 61, and a bolt 63 fixing base portion 60 to foundation portion 48.

Groove portion 58 and protruding portion 59 are formed to extend in the arrangement direction of resonant coil 11 and electromagnetic induction coil 12. A plurality of screw holes 64 are formed in a bottom surface of groove portion 58 and this screw hole 64 is formed to be screwed with bolt 63. Screw holes 64 are spaced apart from one another in the height direction of foundation portion 48. Therefore, a position for fixing support piece 50 can be easily changed and a position for fixing resonant coil 11 can be changed as appropriate.

The extending direction of groove portion 62 of support piece 50 corresponds to the extending direction of resonant coil 11, and a part of resonant coil 11 is attached to groove portion 62.

A groove portion that receives protruding portion 59 is formed in a rear surface of base portion 60. The width of base portion 60 is substantially the same as the groove width of groove portion 58 and a side surface of base portion 60 is in contact with an inner side surface of groove portion 58. Support piece 50 can be easily positioned when support piece 50 is attached to foundation portion 48, and thus, the worker's workload is lightened.

Support piece 51 is formed similarly to support piece 50. Specifically, support piece 51 includes a base portion 65 attached to groove portion 58 and extending in the circumferential direction of outer circumferential surface 52, a projecting portion 66 formed to extend outwardly from base portion 60, a groove portion 67 formed at a tip of projecting portion 66, and a bolt 68 fixing base portion 65 to foundation portion 48.

Groove portion 67 is formed to be capable of receiving a part of electromagnetic induction coil 12. Bolt 68 is attached to screw hole 64 and fixes support piece 51 to foundation portion 48.

Since the plurality of screw holes 64 are formed in the height direction of foundation portion 48 as described above, a spacing between support piece 50 and support piece 51 can be changed as appropriate.

As described above, support piece 50 and support piece 51 are provided to be relatively movable with respect to each other. Therefore, by adjusting the positions for fixing support piece 50 and support piece 51, a spacing between resonant coil 11 and electromagnetic induction coil 12 can be adjusted.

Figure 7:
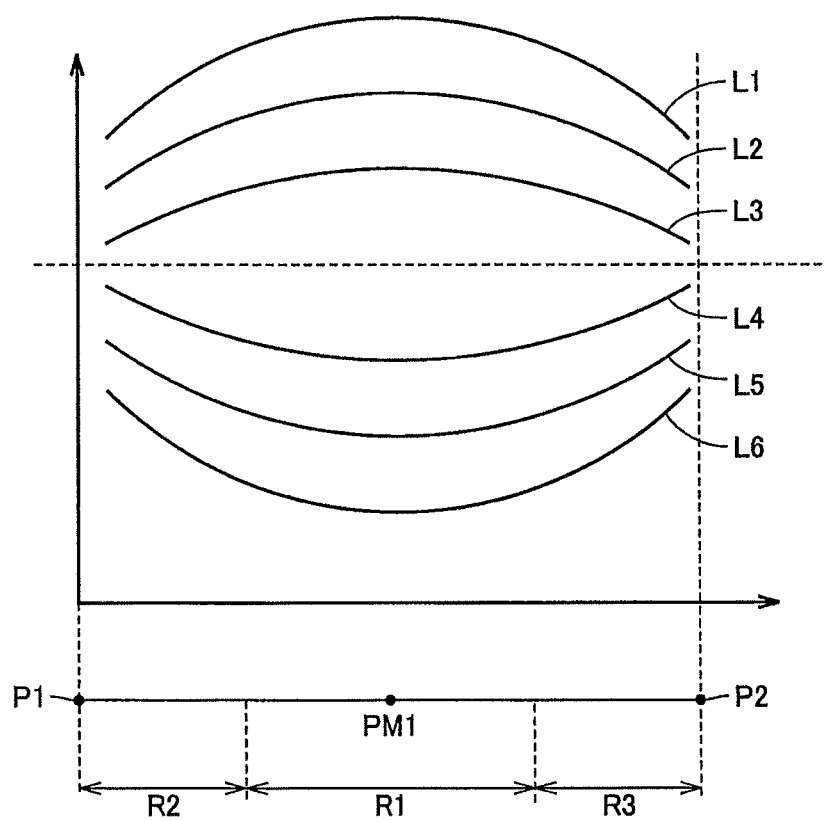
FIG. 7 is a graph showing the relationship between an amount of current flowing through a resonant coil 11 and a position of resonant coil 11 during power transfer.

FIG. 7 is a graph showing the relationship between an amount of current flowing through resonant coil 11 and a position of resonant coil 11 during power transfer.

In this graph, the vertical axis represents the amount of current and the horizontal axis represents the position of resonant coil 11. "PM1" in the horizontal axis represents a point located at a central portion of resonant coil 11 in the length direction of the coil wire. "P1" and "P2" represent the ends of resonant coil 11. The wiring is connected to these ends of resonant coil 11.

Assume that a central region R1 represents intermediate point PM1 and a portion located therearound, and an end region R2 represents end P1 and a portion located therearound. Furthermore, assume that an end region R3 represents end P2 and a portion located therearound.

Curves L1 to L6 shown in FIG. 7 represent current distribution. For example, curve L2 represents current distribution after a small amount of time has elapsed from a state shown by curve L1. Similarly, curves L3, L4, L5, and L6 represent current distribution after a small amount of time has elapsed from states shown by curves L2, L3, L4, and L5, respectively.

As shown in this FIG. 7, the amplitude of the current flowing through resonant coil 11 is maximum at intermediate point PM1 and is minimum at end P1 and end P2.

This shows that the amount of current flowing through central region R1 is larger than the amount of current flowing through end region R2 and end region R3.

Figure 8:
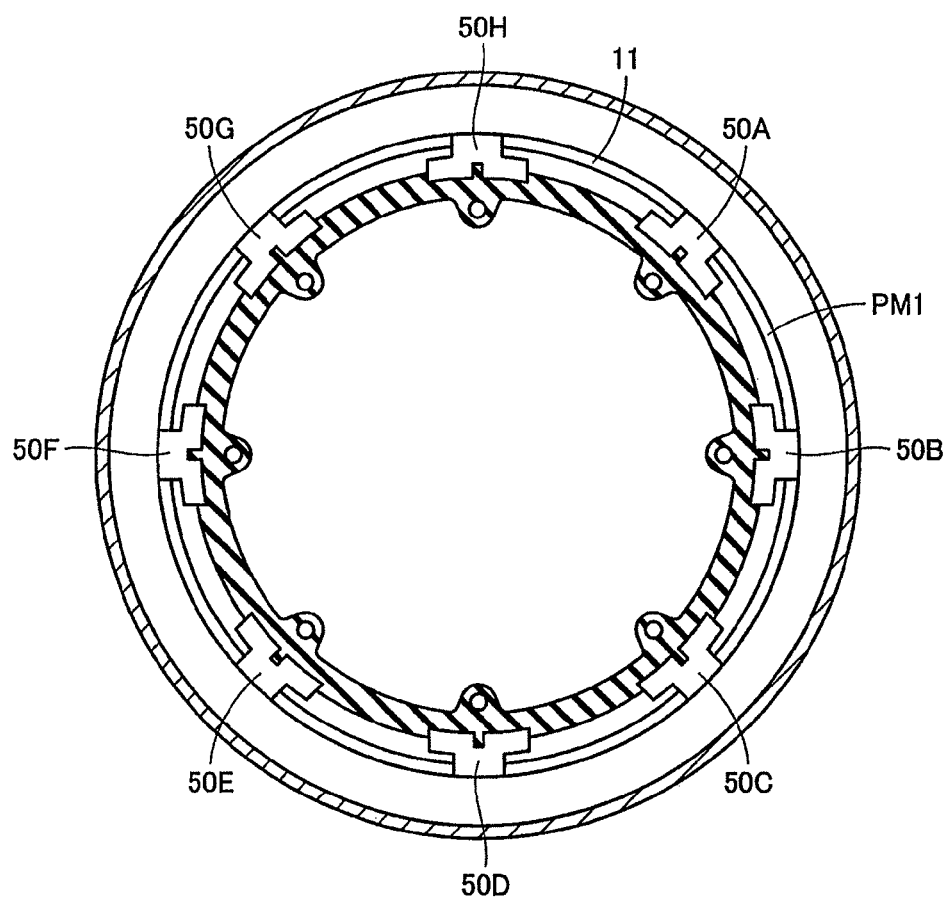
FIG. 8 is a cross-sectional view showing resonant coil 11 and a plurality of support pieces 50.

FIG. 8 is a cross-sectional view showing resonant coil 11 and the plurality of support pieces 50. As shown in this FIG. 8, resonant coil 11 is supported by support pieces 50A to 50H.

Figure 9:
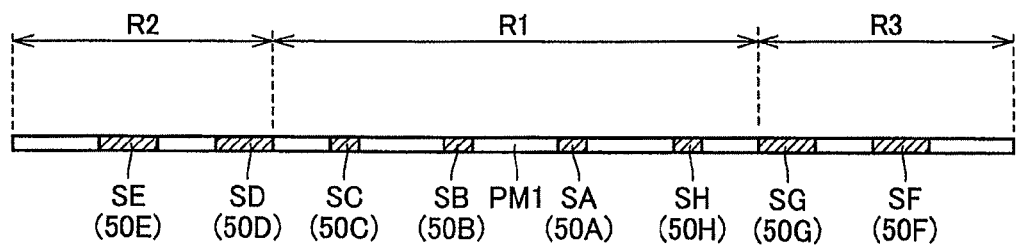
FIG. 9 is a developed view of resonant coil 11.

FIG. 9 is a developed view of resonant coil 11. Contact portions SA, SB, SC, SD, SE, SF, SG, and SH shown in this FIG. 9 represent contact portions between resonant coil 11 and support pieces 50A, 50B, 50C, 50D, 50E, 50F, 50G, and 50H, respectively.

Support pieces 50A, 50B, 50C, and 50H are in contact with a portion of resonant coil 11 where central region R1 is located. On the other hand, support pieces 50D, 50E, 50G, and 50F are in contact with portions of resonant coil 11 where end regions R2 and R3 are located.

As is also clear from this FIG. 9, the area of each of contact portions SA, SB, SC, and SH is smaller than the contact area of each of SD, SE, SF, and SG.

Thus, in the portion of resonant coil 11 where the amount of flowing current is large, the contact area between support piece 50 and resonant coil 11 is decreased, and thereby a dielectric loss can be reduced.

On the other hand, in the portion of resonant coil 11 where the amount of flowing current is small, the contact area between support piece 50 and resonant coil 11 is increased, and thereby resonant coil 11 can be excellently fixed.

Next, a configuration of power transmission device 41 will be described with reference to FIG. 10 and the like. FIG. 11 is an exploded perspective view of power transmission device 41.

Figure 10:
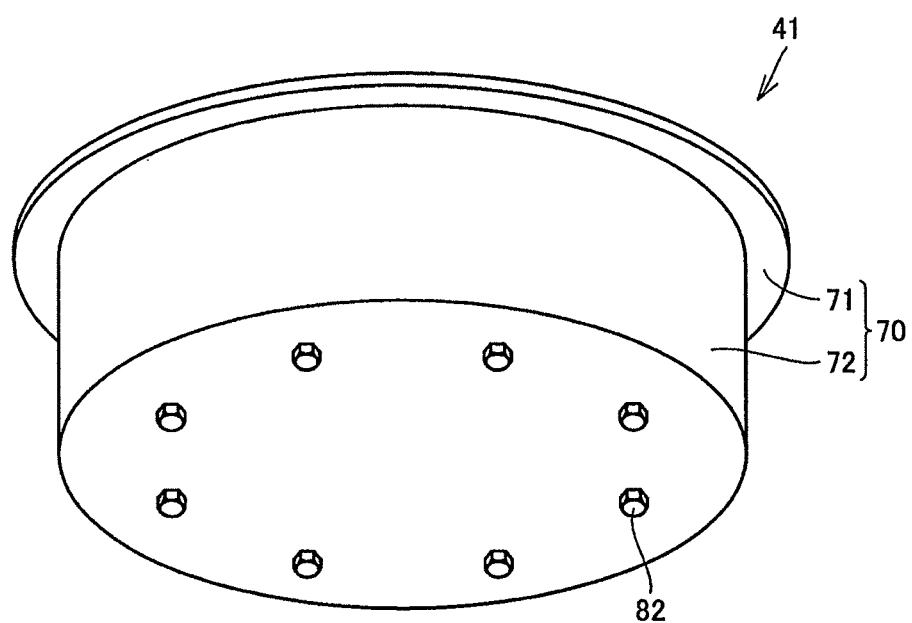
FIG. 10 is a perspective view showing a power transmission device 41.
Figure 11:
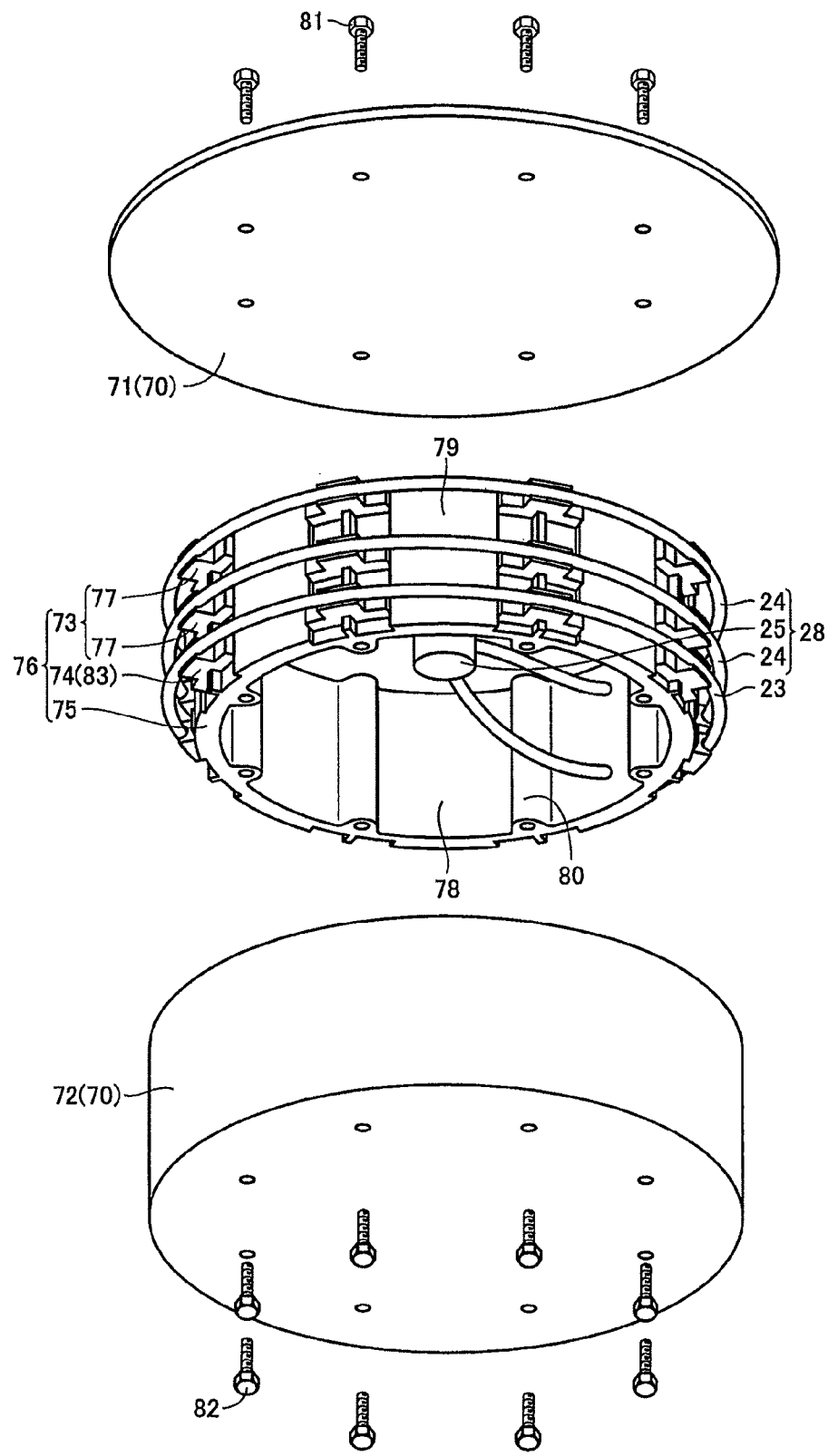
FIG. 11 is an exploded perspective view of power transmission device 41.

As shown in FIGS. 10 and 11, power transmission device 41 includes a housing 70, power transmission-side resonant portion 28, electromagnetic induction coil 23, and a support 76 that supports power transmission-side resonant portion 28.

Housing 70 includes a shield 72 formed such that a top thereof is open, and a lid portion 71 formed to close the opening of shield 72.

Shield 72 is also made of a metal material such as copper and suppresses wide leakage of the electromagnetic field formed around resonant coil 24. Lid portion 71 is made of, for example, a resin material.

Power transmission-side resonant portion 28 includes resonant coil 24 and capacitor 25 connected to opposing ends of this resonant coil 24. Resonant coil 24 is formed by winding a coil wire. The number of coil windings of resonant coil 24 can be changed as appropriate. Capacitor 25 is connected to the opposing ends of resonant coil 24 by a wiring.

Electromagnetic induction coil 23 is formed by winding a coil wire, and electromagnetic induction coil 23 receives electric power from resonant coil 24 by electromagnetic induction.

Support 76 includes a coil support member 73 that supports resonant coil 24, a coil support member 74 that supports electromagnetic induction coil 23, and a cylindrically-formed foundation portion 75. Foundation portion 48 includes an inner circumferential surface 78 and an outer circumferential surface 79 extending along resonant coil 24. Foundation portion 75 functions as a support member that supports coil support member 73 and coil support member 74.

A plurality of bushes 80 spaced apart from one another in the circumferential direction of inner circumferential surface 78 are formed on inner circumferential surface 78. Bush 80 is provided with a screw hole.

Bush 80 is formed to extend from one opening edge to the other opening edge of foundation portion 75, and the screw holes are formed at opposing ends of bush 80. A bolt 81 is attached to an upper end of each bush 80, and lid portion 71 and foundation portion 75 are fixed by this bolt 81. A bolt 82 is attached to a lower end of bush 80, and shield 72 and foundation portion 75 are fixed by this bolt 82. Capacitor 25 is arranged inside cylindrically-formed foundation portion 75.

Outer circumferential surface 79 of foundation portion 75 is formed to extend along resonant coil 24 and electromagnetic induction coil 23. The wiring connecting resonant coil 24 and capacitor 25 is connected to the ends of resonant coil 24. This wiring is formed to extend from outer circumferential surface 79 to inner circumferential surface 78 of foundation portion 75 through foundation portion 75.

On the other hand, resonant coil 24 is spaced apart from foundation portion 75 by coil support member 73. Similarly, electromagnetic induction coil 23 is also spaced apart from foundation portion 75 by coil support member 74. It is needless to say that the shapes of electromagnetic induction coil 23, resonant coil 24 and foundation portion 75 can be changed as appropriate in power transmission device 41 as well.

Coil support member 73 includes a plurality of support pieces 77 provided on outer circumferential surface 79 and supporting resonant coil 24. Resonant coil 24 is spaced apart from outer circumferential surface 79 by support pieces 77.

Coil support member 74 includes a plurality of support pieces 83 provided on the outer circumferential surface of foundation portion 75 and supporting electromagnetic induction coil 23. Electromagnetic induction coil 23 is spaced apart from outer circumferential surface 79 by the plurality of support pieces 83.

Foundation portion 75, support piece 77 and support piece 83 are all made of a resin material. A dielectric tangent of the resin forming support piece 77 and support piece 83 is smaller than a dielectric tangent of the resin forming foundation portion 48.

Foundation portion 75 is made of, for example, urethane, ABS resin (thermoplastic resin made up of three components of acrylonitrile, butadiene and styrene), FRP resin and the like. The FRP resin can be obtained by curing an epoxy resin or a polyester resin with glass fiber or carbon cloth.

Support piece 77 is made of, for example, fluorine resin such as Teflon (registered trademark), PP (polypropylene), SPS ceramics and the like. The SPS ceramics are refractory ceramics obtained by the spark plasma sintering (SPS) method. Support piece 83 is made of the same material as that of support piece 77.

As a result, a dielectric loss that occurs at support piece 77 and support piece 83 during power transfer can be reduced.

Furthermore, since foundation portion 75 is made of an inexpensive resin material, the manufacturing cost of power transmission device 41 can be reduced.

Figure 12:
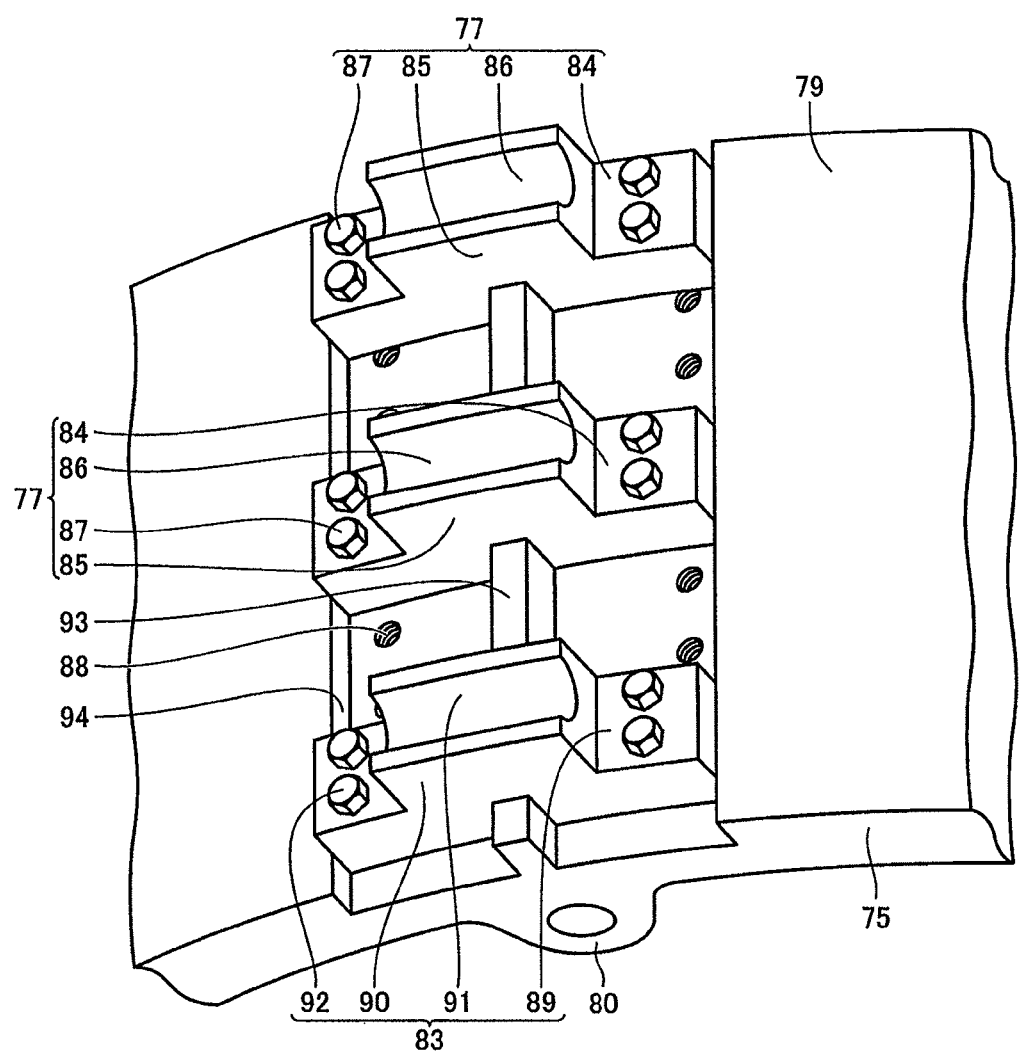
FIG. 12 is a perspective view showing a support piece 77 and a support piece 83.

FIG. 12 is a perspective view showing support piece 77 and support piece 83. As shown in this FIG. 12, a groove portion 94 extending in the height direction is also formed in outer circumferential surface 79 of foundation portion 75, and a protruding portion 93 is formed at a central portion of this groove portion 94 in the width direction.

Support piece 77 includes a base portion 84 attached to groove portion 94 and extending in the circumferential direction of outer circumferential surface 79, a projecting portion 85 formed to protrude outwardly from this base portion 84, a groove portion 86 formed at a tip of projecting portion 85, and a bolt 87 fixing base portion 84 to foundation portion 75.

Groove portion 94 and protruding portion 93 are formed to extend in the arrangement direction of electromagnetic induction coil 23 and resonant coil 24. A plurality of screw holes 88 are formed in a bottom surface of groove portion 94 and this screw hole 88 is formed to be screwed with bolt 87. Screw holes 88 are spaced apart from one another in the height direction of foundation portion 75. Therefore, a position for fixing support piece 77 can be easily changed and a position for fixing resonant coil 24 can be changed as appropriate.

Groove portion 86 of support piece 77 corresponds to the extending direction of resonant coil 24, and a part of resonant coil 24 is attached to groove portion 86.

A groove portion that receives protruding portion 93 is formed in a rear surface of base portion 84. The width of base portion 84 is substantially the same as the groove width of groove portion 94 and a side surface of base portion 84 is in contact with an inner side surface of groove portion 94. Support piece 77 can be easily positioned when support piece 77 is attached to foundation portion 75, and thus, the worker's workload is lightened.

Support piece 83 is also formed similarly to support piece 77. Specifically, support piece 83 includes a base portion 89 attached to groove portion 94 and extending in the circumferential direction of outer circumferential surface 79, a protruding portion 90 formed to extend outwardly from base portion 89, a groove portion 91 formed at a tip of protruding portion 90, and a bolt 92 fixing base portion 89 to foundation portion 75.

Groove portion 91 is formed to be capable of receiving a part of electromagnetic induction coil 23. Bolt 92 is also attached to screw hole 88 and fixes support piece 83 to foundation portion 75.

Since the plurality of screw holes 88 are formed in the height direction of foundation portion 75 as described above, a spacing between support piece 83 and support piece 77 can be changed as appropriate.

As described above, support piece 83 and support piece 77 are provided to be relatively movable with respect to each other. Therefore, by adjusting the positions for fixing support piece 77 and support piece 83, a spacing between electromagnetic induction coil 23 and resonant coil 24 can be adjusted.

Figure 13:
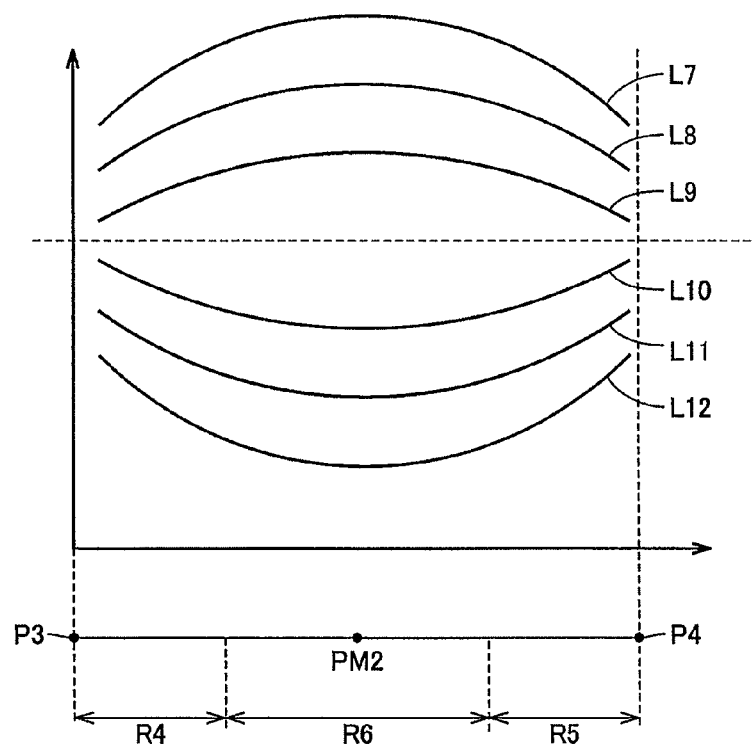
FIG. 13 is a graph showing the relationship between an amount of current flowing through a resonant coil 24 and a position of resonant coil 24 during power transfer.

FIG. 13 is a graph showing the relationship between an amount of current flowing through resonant coil 24 and a position of resonant coil 24 during power transfer.

In this graph, the vertical axis represents the amount of current and the horizontal axis represents the position of resonant coil 24. "PM2" in the horizontal axis represents a point located at a central portion of resonant coil 24 in the length direction of the coil wire. "P3" and "P4" represent the ends of resonant coil 24. The wiring is connected to these ends of resonant coil 24.

Assume that a central region R6 represents intermediate point PM2 and a portion located therearound, and an end region R4 represents end P3 and a portion located therearound. Furthermore, assume that an end region R5 represents end P4 and a portion located therearound.

Curves L7 to L12 shown in FIG. 13 represent current distribution. For example, curve L8 represents current distribution after a small amount of time has elapsed from a state shown by curve L7. Similarly, curves L9, L10, L11, and L12 represent current distribution after a small amount of time has elapsed from states shown by curves L8, L9, L10, and L11, respectively.

As shown in this FIG. 13, the amplitude of the current flowing through resonant coil 24 is maximum at intermediate point PM2 and is minimum at end P3 and end P4.

This shows that the amount of current flowing through central region R6 is larger than the amount of current flowing through end region R4 and end region R5.

Figure 15:
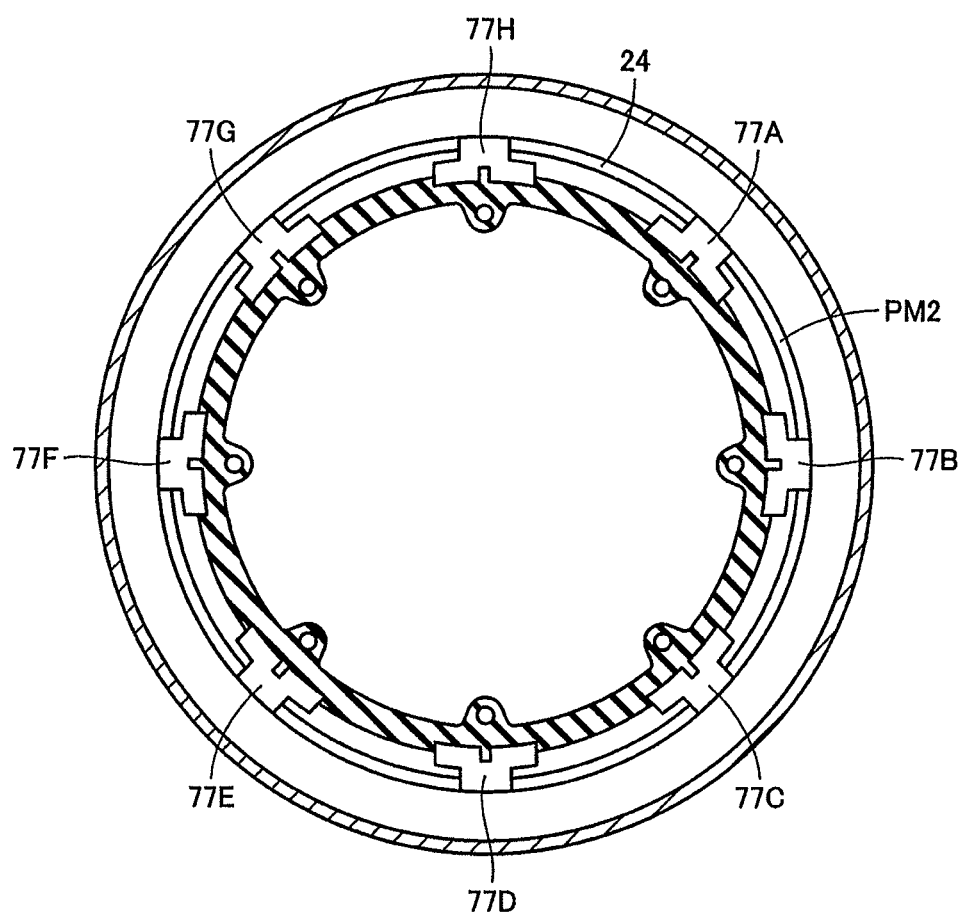
FIG. 15 is a cross-sectional view showing resonant coil 24 and a plurality of support pieces 77.

FIG. 15 is a cross-sectional view showing resonant coil 24 and the plurality of support pieces 77. As shown in this FIG. 15, resonant coil 24 is supported by support pieces 77A to 77H.

Figure 14:
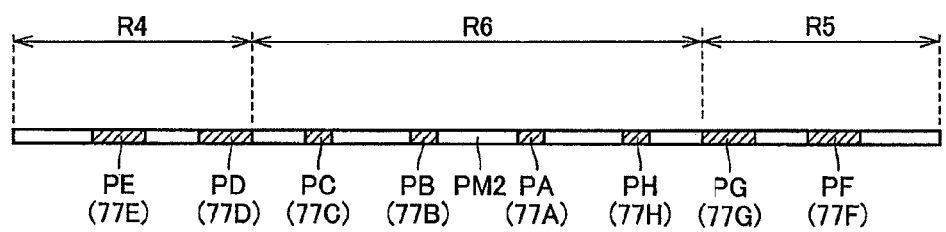
FIG. 14 is a developed view of resonant coil 24.

FIG. 14 is a developed view of resonant coil 24. Contact portions PA, PB, PC, PD, PE, PF, PG, and PH shown in this FIG. 14 represent contact portions between resonant coil 24 and support pieces 77A, 77B, 77C, 77D, 77E, 77F, 77G, and 77H, respectively.

Support pieces 77A, 77B, 77C, and 77H are in contact with a portion of resonant coil 24 where central region R6 is located. On the other hand, support pieces 77D, 77E, 77G, and 77F are in contact with portions of resonant coil 24 where end regions R4 and R5 are located.

As is also clear from this FIG. 14, the area of each of contact portions PA, PB, PC, and PH is smaller than the contact area of PD, PE, PF, and PG.

Thus, in the portion of resonant coil 24 where the amount of flowing current is large, the contact area between support piece 77 and resonant coil 24 is decreased, and thereby a dielectric loss can be reduced.

On the other hand, in the portion of resonant coil 24 where the amount of flowing current is small, the contact area between support piece 77 and resonant coil 24 is increased, and thereby resonant coil 24 can be excellently fixed.

Figure 16:
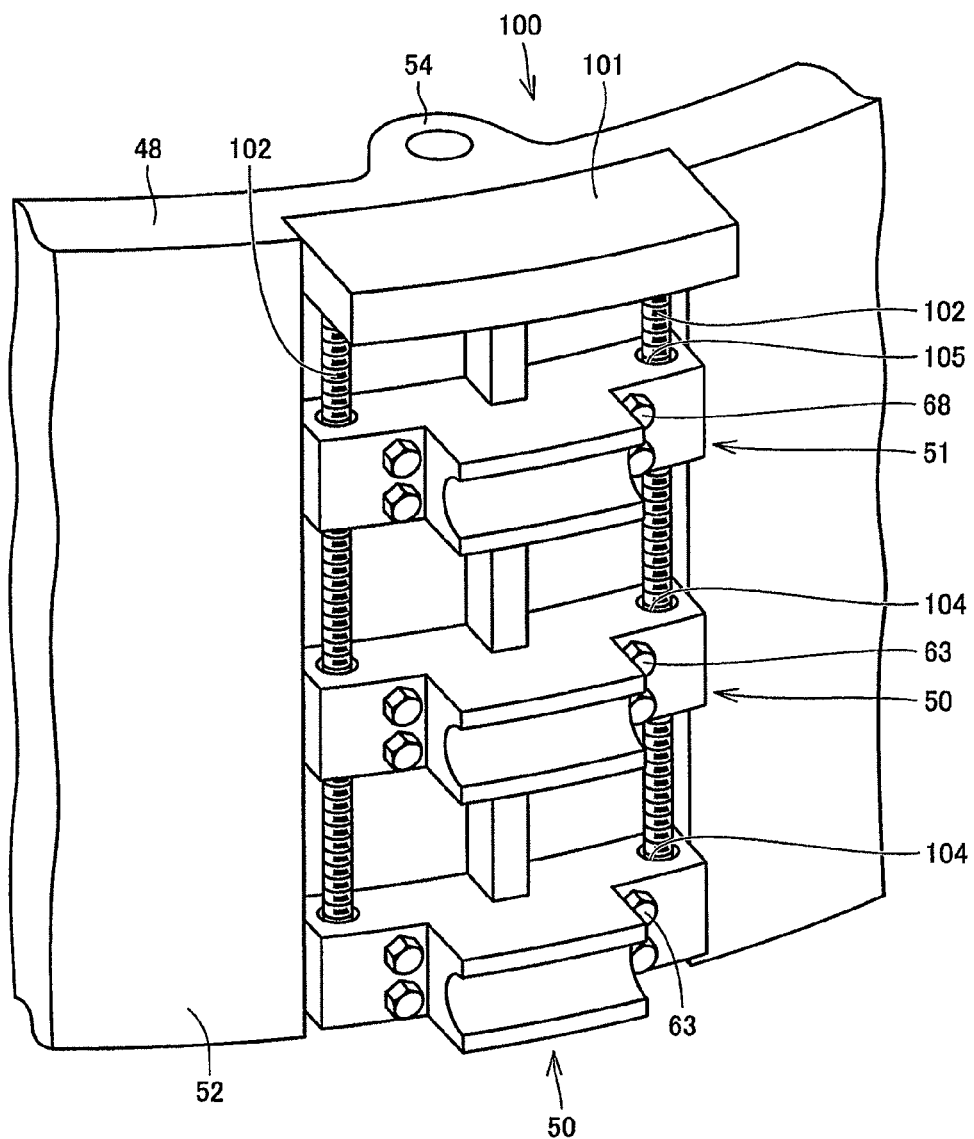
FIG. 16 is a perspective view showing a modification of a method for fixing support piece 50.

FIG. 16 is a perspective view showing a modification of a method for fixing support piece 50. In an example shown in this FIG. 16, power reception device 40 includes a drive device 100 that moves support piece 50 in the height direction of foundation portion 48.

Drive device 100 includes a motor 101, a spline 102 rotated by this motor 101 and having a screw groove on a circumferential surface thereof, and a receiving portion 104 provided at support piece 50 and engaging with the screw groove of spline 102. Support piece 51 is provided with a through hole 105 into which spline 102 is inserted.

Motor 101 rotates spline 102, and thereby support piece 50 provided with receiving portion 104 moves in the vertical direction. As a result, a spacing between support piece 51 and support piece 50 can be adjusted.

Figure 17:
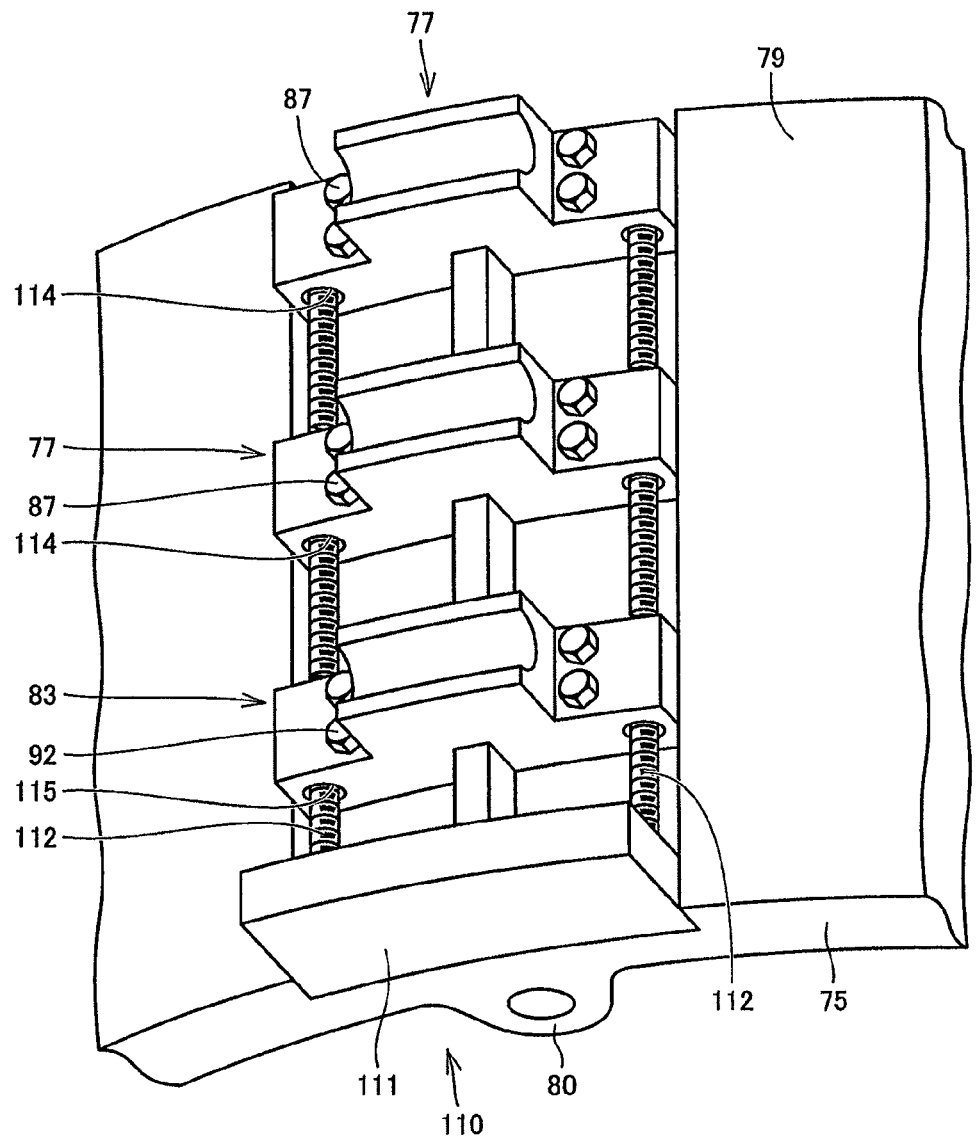
FIG. 17 is a perspective view showing a modification of a method for fixing support piece 77.

FIG. 17 is a perspective view showing a modification of a method for fixing support piece 77. As shown in this FIG. 17, power transmission device 41 includes a drive device 110 that moves support piece 77 in the height direction of foundation portion 75.

Drive device 110 includes a motor 111, a spline 112 rotated by this motor 111 and having a screw groove on a circumferential surface thereof, and a receiving portion 114 provided at support piece 77 and engaging with the screw groove of spline 112. Support piece 83 is provided with a through hole 115 into which spline 112 is inserted.

Drive device 110 rotates spline 112, and thereby support piece 77 provided with receiving portion 114 moves in the vertical direction.

As a result, a spacing between electromagnetic induction coil 23 and resonant coil 24 can be adjusted.

Second Embodiment

Power reception device 40, power transmission device 41, and a power transfer system including power reception device 40 and power transmission device 41 according to a second embodiment will be described with reference to FIGS. 18 to 25. The same reference characters are assigned to the components shown in FIGS. 18 to 25 above that are the same as or corresponding to the components shown in FIGS. 1 to 17 above, and description thereof will not be repeated.

Figure 18:
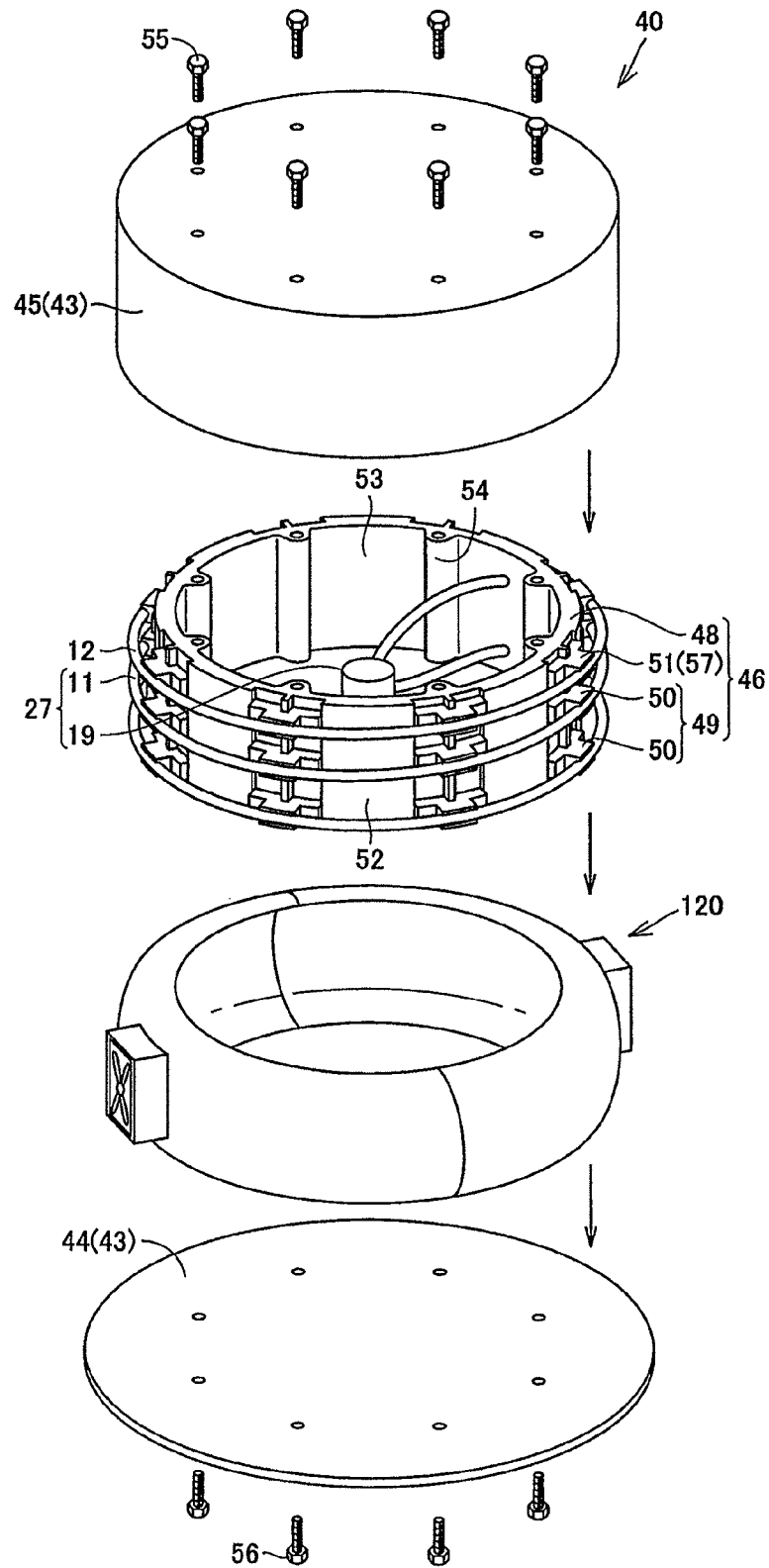
FIG. 18 is an exploded perspective view of power reception device 40 according to a second embodiment.

FIG. 18 is an exploded perspective view of power reception device 40 according to the second embodiment. As shown in this FIG. 18, power reception device 40 includes power reception-side resonant portion 27, electromagnetic induction coil 12, housing 43 that contains power reception-side resonant portion 27 and electromagnetic induction coil 12, support 46 that fixes power reception-side resonant portion 27 and electromagnetic induction coil 12, and a flow path defining member 120 attached to this support 46. Flow path defining member 120 is arranged on an outer circumferential surface of cylindrically-formed support 46.

Figure 19:
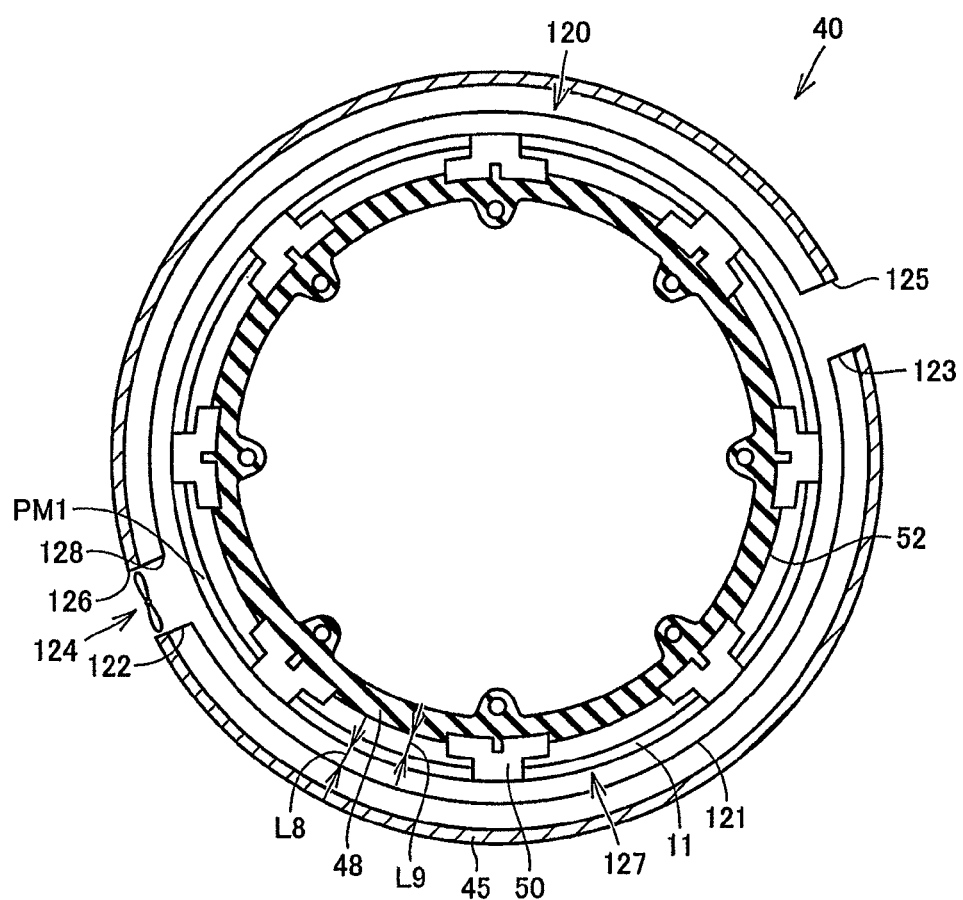
FIG. 19 is a cross-sectional view showing power reception device 40 according to the present embodiment.

FIG. 19 is a cross-sectional view showing power reception device 40 according to the present embodiment. In this FIG. 19, capacitor 19 is omitted.

As shown in this FIG. 19, flow path defining member 120 includes an annular main body portion 121 extending along outer circumferential surface 52, a supply pipe 122 connected to this main body portion 121, an exhaust pipe 123 connected to main body portion 121, and a fan 124 provided within supply pipe 122.

Main body portion 121 extends along resonant coil 11, and a cooling medium flow path 127 is formed between main body portion 121 and outer circumferential surface 52 of foundation portion 48.

Shield 45 is provided with an opening 125 and an opening 126. Supply pipe 122 is connected to opening 126 and exhaust pipe 123 is connected to opening 125.

Fan 124 functions as a cooling medium supply device that supplies cooling air into cooling medium flow path 127, and the air outside power reception device 40 is supplied into cooling medium flow path 127. A connection portion connecting supply pipe 122 and main body portion 121 is provided with an opening 128. Opening 128 is formed at a position facing intermediate point PM1 of resonant coil 11.

An amount of current flowing through intermediate point PM1 of resonant coil 11 and the portion located therearound is larger than an amount of current flowing through the other portions of resonant coil 11.

In this power reception device 40, the cooling air is blown from supply pipe 122 onto intermediate point PM1 and the portion located therearound, to suppress increase in temperature of intermediate point PM1 and the portion located therearound. Thereafter, the cooling air flows through cooling medium flow path 127 and cools resonant coil 11. Then, the cooling air is exhausted from exhaust pipe 123 to the outside.

Figure 20:
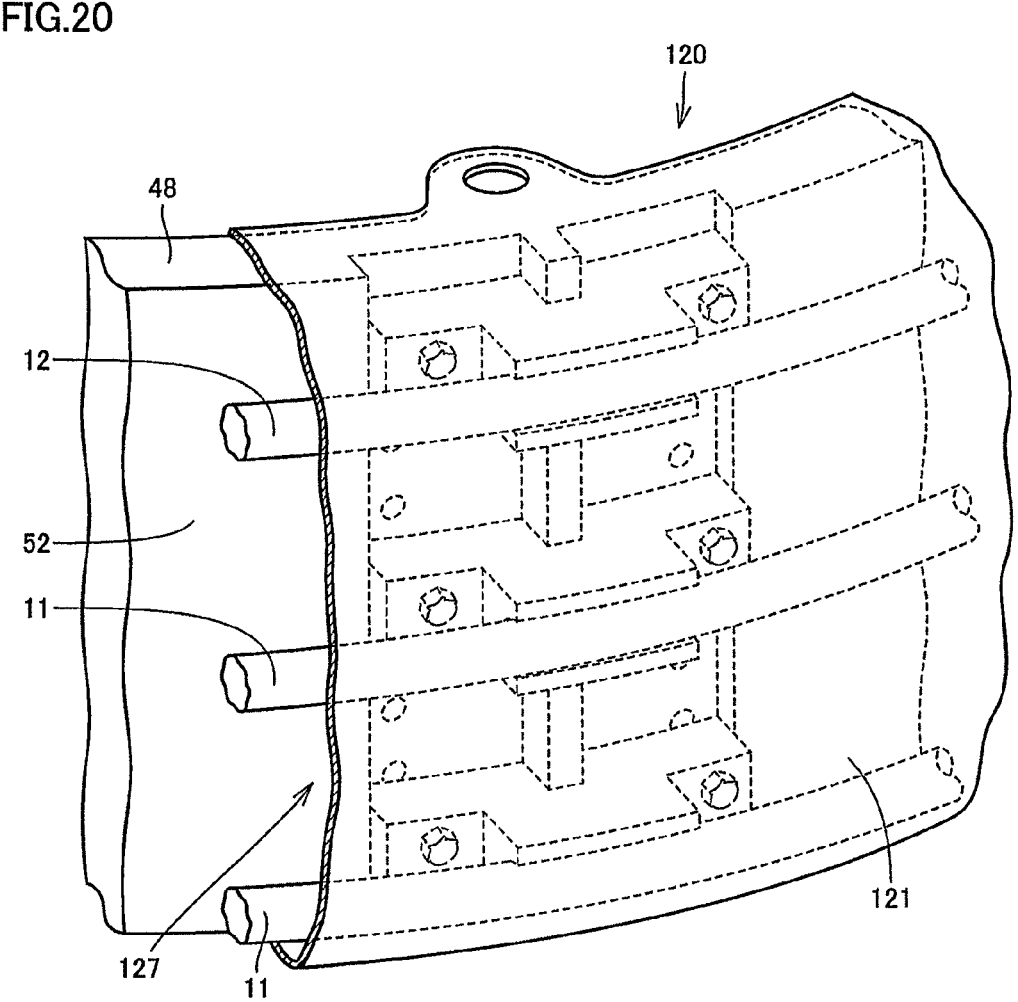
FIG. 20 is a perspective view showing a part of a flow path defining member 120.

FIG. 20 is a perspective view showing a part of flow path defining member 120. As shown in this FIG. 20 and FIG. 19 above, flow path defining member 120 is formed to cover resonant coil 11 and electromagnetic induction coil 12 and to extend along resonant coil 11 and electromagnetic induction coil 12. Flow path defining member 120 is spaced apart from resonant coil 11 and electromagnetic induction coil 12, and thereby a dielectric loss that occurs at flow path defining member 120 is reduced.

Flow path defining member 120 is made of a resin material. A dielectric tangent of the resin material forming flow path defining member 120 is larger than a dielectric tangent of the resin forming support piece 50, and flow path defining member 120 is made of an inexpensive resin material.

A distance L8 between resonant coil 11 and flow path defining member 120 is smaller than a distance L9 between resonant coil 11 and foundation portion 48, which allows size reduction of cooling medium flow path 127.

Since the thickness of flow path defining member 120 is smaller than thickness of foundation portion 48, a dielectric loss that occurs at flow path defining member 120 is reduced.

Figure 21:
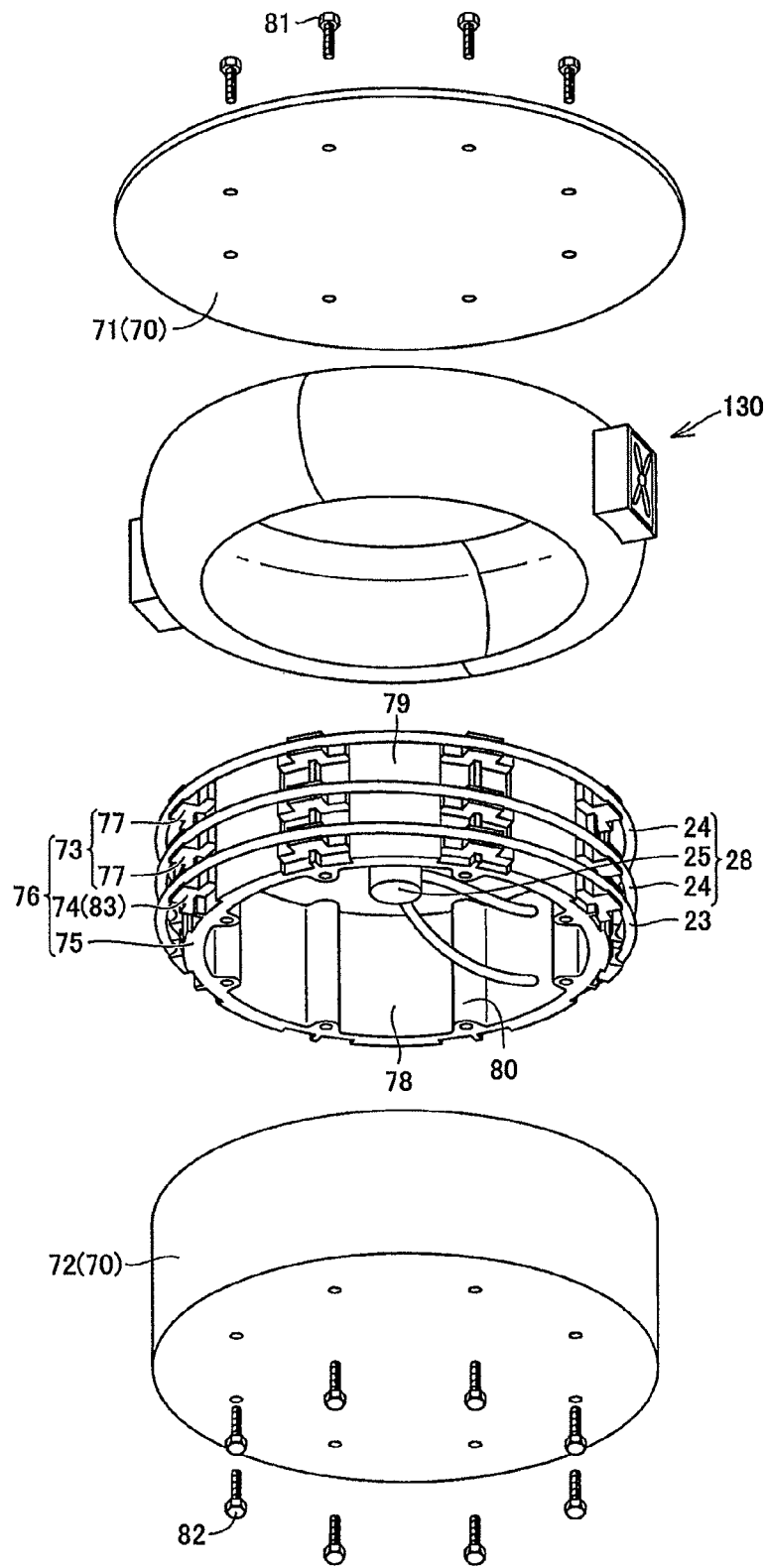
FIG. 21 is an exploded perspective view of power transmission device 41 according to the second embodiment.

FIG. 21 is an exploded perspective view of power transmission device 41 according to this second embodiment. As shown in this FIG. 21, power transmission device 41 includes power transmission-side resonant portion 28, electromagnetic induction coil 23, housing 70 that contains power transmission-side resonant portion 28 and electromagnetic induction coil 23, support 76 that retains power transmission-side resonant portion 28 and electromagnetic induction coil 23, and a flow path defining member 130 attached to this support 76. Flow path defining member 130 is attached to the outer circumferential surface of cylindrically-formed foundation portion 75.

Figure 22:
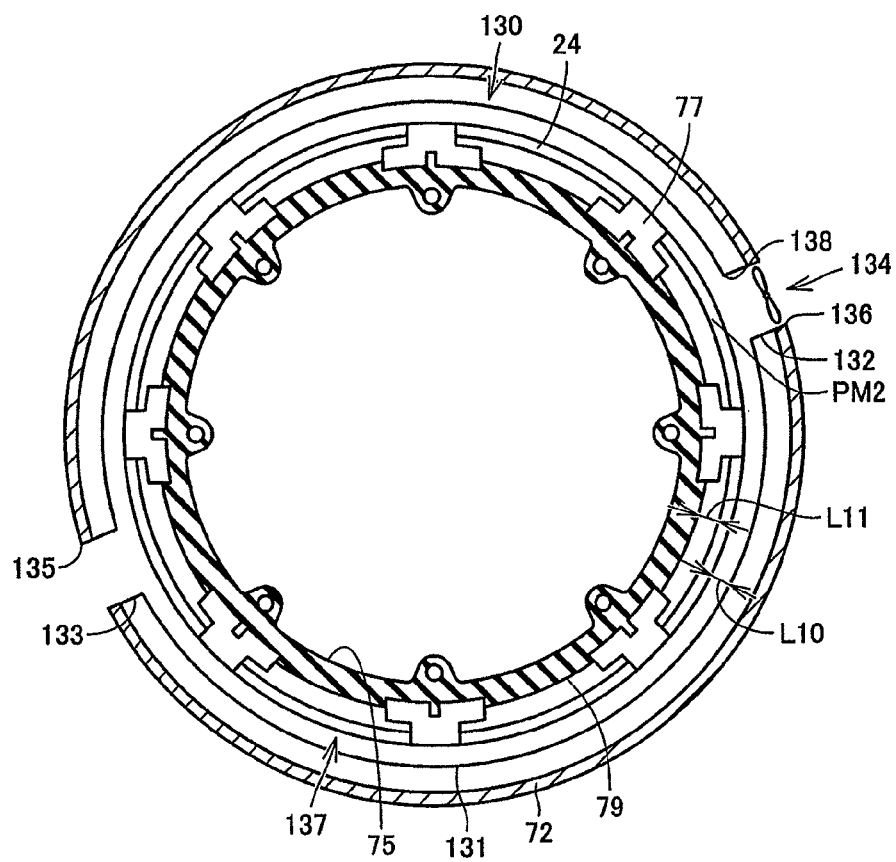
FIG. 22 is a cross-sectional view showing a modification of power reception device 40 according to the second embodiment.

FIG. 22 is a cross-sectional view of power transmission device 41 according to this second embodiment. In this FIG. 22 as well, the capacitor is omitted.

As shown in this FIG. 22, flow path defining member 130 includes an annular main body portion 131 extending along outer circumferential surface 79, a supply pipe 132 connected to this main body portion 131, an exhaust pipe 133 connected to main body portion 131, and a fan 134 provided within supply pipe 132.

Main body portion 131 extends along resonant coil 24, and a cooling medium flow path 137 is formed between main body portion 131 and outer circumferential surface 79 of foundation portion 75. Shield 72 is provided with an opening 135 and an opening 136. Supply pipe 132 is connected to opening 136 and exhaust pipe 133 is connected to opening 135.

Fan 134 functions as a cooling medium supply device that supplies cooling air into cooling medium flow path 137, and the air outside power transmission device 41 is supplied into cooling medium flow path 137. A connection portion connecting supply pipe 132 and main body portion 131 is provided with an opening 138. Opening 138 is formed at a position facing intermediate point PM2 of resonant coil 24.

An amount of current flowing though intermediate point PM2 of resonant coil 24 and the portion located therearound is larger than an amount of current flowing through the other portions of resonant coil 24.

In this power transmission device 41, the cooling air is blown from supply pipe 132 onto intermediate point PM2 and the portion located therearound, to suppress increase in temperature of intermediate point PM2 and the portion located therearound. Thereafter, the cooling air flows through cooling medium flow path 137 and cools resonant coil 24. Then, the cooling air is exhausted from exhaust pipe 133 to the outside.

Figure 23:
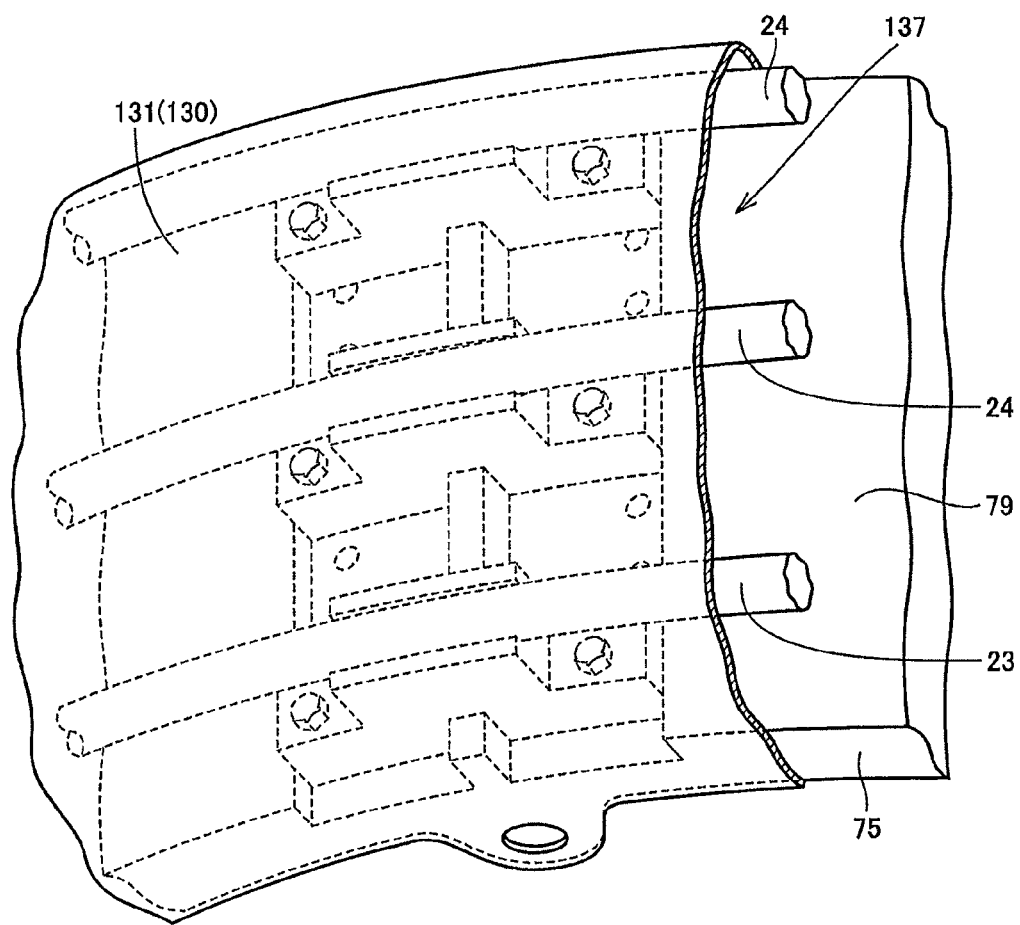
FIG. 23 is a perspective view showing a part of a cooling medium flow path 137.

FIG. 23 is a perspective view showing a part of cooling medium flow path 137. As shown in this FIG. 23 and FIG. 22 above, flow path defining member 130 is formed to cover electromagnetic induction coil 23 and resonant coil 24 and to extend along electromagnetic induction coil 23 and resonant coil 24. Flow path defining member 130 is spaced apart from electromagnetic induction coil 23, and flow path defining member 130 is spaced apart from resonant coil 24. As a result, a dielectric loss that occurs at flow path defining member 130 is reduced.

Flow path defining member 130 is also made of a resin material. A dielectric tangent of the resin material forming flow path defining member 130 is larger than a dielectric tangent of the resin material forming support piece 77, and flow path defining member 130 is made of an inexpensive resin material.

A distance L10 between resonant coil 24 and flow path defining member 130 is smaller than a distance L11 between foundation portion 75 and resonant coil 24, which allows size reduction of cooling medium flow path 137. Since the thickness of flow path defining member 130 is smaller than the thickness of foundation portion 75, a dielectric loss that occurs at flow path defining member 130 is reduced.

Figure 24:
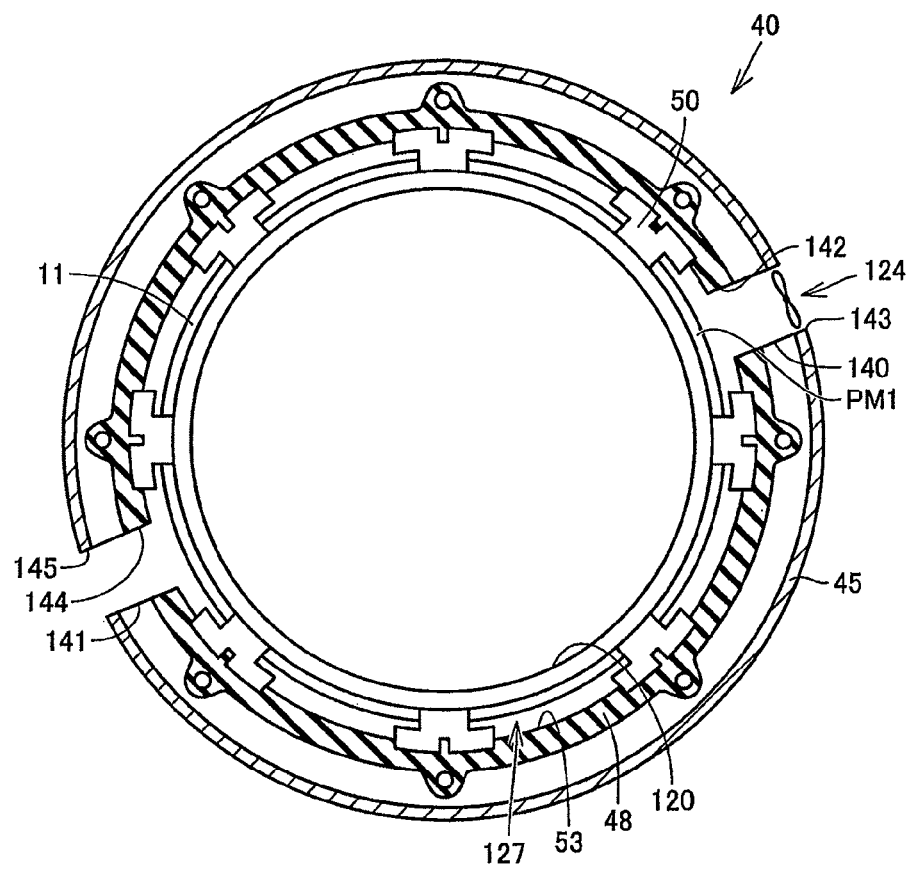
FIG. 24 is a cross-sectional view showing a modification of power reception device 40 according to the second embodiment.

FIG. 24 is a cross-sectional view showing a modification of power reception device 40 according to this second embodiment. In an example shown in this FIG. 24, power reception device 40 includes cylindrically-formed foundation portion 48, resonant coil 11 arranged on the inner circumferential surface 53 side of foundation portion 48, the plurality of support pieces 50 provided on inner circumferential surface 53, and cylindrical flow path defining member 120 arranged on the inner side than resonant coil 11. Power reception device 40 further includes electromagnetic induction coil 12 arranged on the inner circumferential surface 53 side, the plurality of support pieces 50 arranged on inner circumferential surface 53 and supporting electromagnetic induction coil 12, a supply pipe 140, and an exhaust pipe 141.

Flow path defining member 120 is formed to extend along resonant coil 11, and cooling medium flow path 127 is formed between flow path defining member 120 and inner circumferential surface 53.

Foundation portion 48 is provided with openings 142 and 144. A portion of shield 45 facing opening 142 is provided with an opening 143, and a portion of shield 45 facing opening 144 is provided with an opening 145.

Supply pipe 140 is arranged to connect opening 142 and opening 143, and fan 124 is arranged inside supply pipe 140. Exhaust pipe 141 is arranged to connect opening 144 and opening 145. Opening 142 is provided at a position facing intermediate point PM1 of resonant coil 11.

Therefore, the cooling air from fan 124 is first blown onto intermediate point PM1 of resonant coil 11 and the portion located therearound, to suppress increase in temperature of intermediate point PM1 and the portion located therearound.

Figure 25:
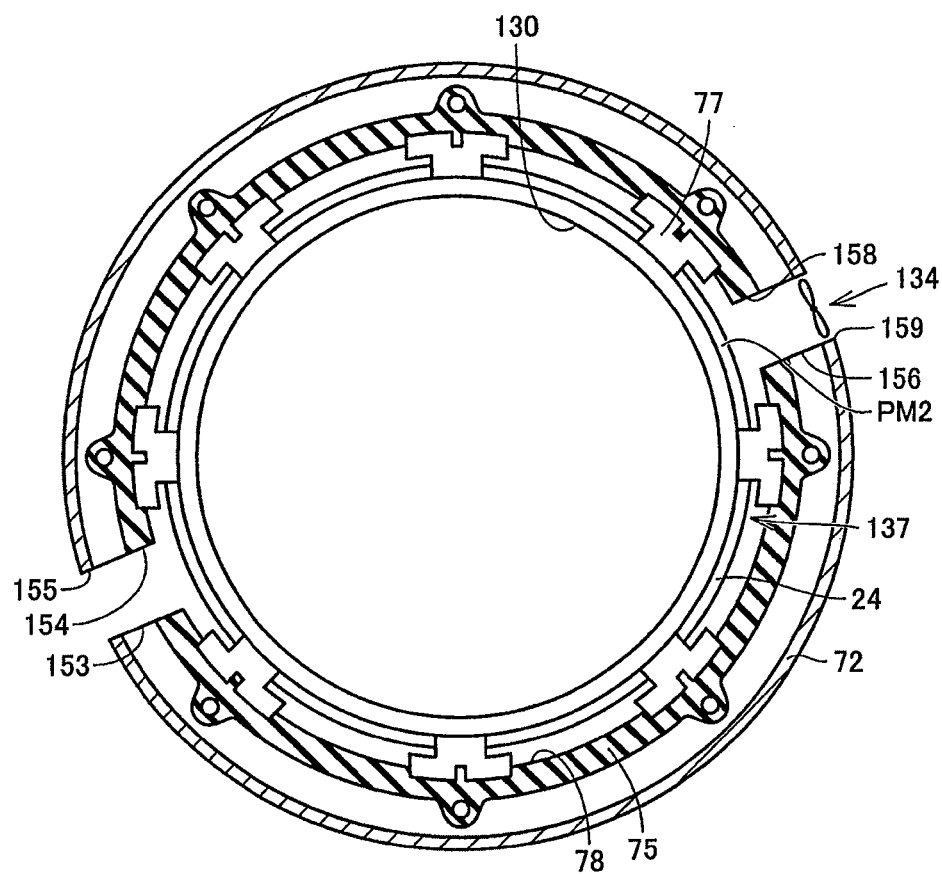
FIG. 25 is a cross-sectional view showing a modification of power transmission device 41 according to the second embodiment.

FIG. 25 is a cross-sectional view showing a modification of power transmission device 41 according to this second embodiment. In an example shown in this FIG. 25, power transmission device 41 includes cylindrically-formed foundation portion 75, resonant coil 24 arranged on the inner circumferential surface 78 side of foundation portion 75, the plurality of support pieces 77 provided on inner circumferential surface 78, and annular flow path defining member 130 arranged on the inner side than resonant coil 24. Power transmission device 41 further includes electromagnetic induction coil 23 arranged on the inner circumferential surface 78 side, the plurality of support pieces 77 provided on inner circumferential surface 78 and supporting electromagnetic induction coil 23, a supply pipe 156, and an exhaust pipe 153.

Flow path defining member 130 is formed to extend along electromagnetic induction coil 23 and resonant coil 24, and cooling medium flow path 137 is formed between flow path defining member 130 and inner circumferential surface 78.

Foundation portion 75 is provided with openings 154 and 158. A portion of shield 72 facing opening 154 is provided with an opening 155, and a portion of shield 72 facing opening 158 is provided with an opening 159.

Supply pipe 156 is formed to connect opening 158 and opening 159, and fan 134 is arranged inside supply pipe 156. Exhaust pipe 153 is formed to connect opening 154 and opening 155.

Opening 158 is arranged to face intermediate point PM2 of resonant coil 24 and the portion located therearound. As a result, increase in temperature of intermediate point PM2 of resonant coil 24 and the portion located therearound can be suppressed.

In the aforementioned first and second embodiments, the example has been described in which the resonant coil is used as the member that receives electric power from the electromagnetic field. A rod-like antenna or fishbone-shaped antenna can, however, be used as the member that receives electric power from the electromagnetic field.

Although the embodiments of the present invention have been described above, it should be understood that the embodiments disclosed herein are illustrative and non-restrictive in every respect. The scope of the present invention is defined by the terms of the claims, and is intended to include any modifications within the scope and meaning equivalent to the terms of the claims.

INDUSTRIAL APPLICABILITY

The present invention is applicable to the power reception device, the power transmission device and the power transfer system.

REFERENCE SIGNS LIST 10 electrically powered vehicle; 11, 24 resonant coil; 12, 23 electromagnetic induction coil; 13 rectifier; 14 converter; 15 battery; 16 power control unit; 17 motor unit; 19, 25 capacitor; 20 external power feeding apparatus; 21 AC power supply; 22 high-frequency power driver; 26 control unit; 27 power reception-side resonant portion; 28 power transmission-side resonant portion; 31 high-frequency power supply; 32 primary coil; 33 primary resonant coil; 34 secondary resonant coil; 35 secondary coil; 36 load; 40 power reception device; 41 power transmission device; 42 parking space; 43, 70 housing; 44, 71 lid portion; 45, 72 shield; 46, 76 support; 48, 75 foundation portion; 49, 57, 73, 74 coil support member; 50, 50A to 50H, 51, 77, 77A to 77H, 83 support piece; 52, 79 outer circumferential surface; 53, 78 inner circumferential surface; 54, 80 bush; 55, 56, 63, 68, 81, 87, 92 bolt; 58, 62, 67, 86, 91, 94 groove portion; 59, 90, 93 protruding portion; 60, 65, 84, 89 base portion; 61, 66, 85 projecting portion; 64, 88 screw hole; 100, 110 drive device; 101, 111 motor; 102, 112 spline; 104, 114 receiving portion; 105, 115 through hole; 120 flow path defining member; 121, 131 main body portion; 122, 132, 140, 156 supply pipe; 123, 133, 141, 153 exhaust pipe; 124, 134 fan; 127, 137 cooling medium flow path.

The invention claimed is:

1. A power reception device, comprising:
    a vehicle-side resonant portion mounted on a vehicle and resonating, through an electromagnetic field, with a facility-side resonant portion provided in an external facility; and
    a vehicle-side support including a first support member supporting said vehicle-side resonant portion, and a second support member spaced apart from said vehicle-side resonant portion and supporting said first support member, wherein
    a dielectric tangent of said first support member is smaller than a dielectric tangent of said second support member.

2. The power reception device according to claim 1, wherein
    said vehicle-side resonant portion includes a first resonant coil formed by winding a first coil wire,
    said second support member includes a circumferential surface extending along said first resonant coil, and
    said first support member includes a plurality of vehicle-side support pieces provided on said circumferential surface of said second support member, spaced apart from one another in a length direction of said first coil wire, and supporting said first resonant coil.

3. The power reception device according to claim 2, wherein
    said first resonant coil includes an intermediate region including a central portion in the length direction of said first coil wire and a portion located around said central portion as well as an end region including an end of said first coil wire and a portion located around said end,
    said first support member includes a first support piece supporting a portion of said first resonant coil located in said intermediate region, and a second support piece supporting a portion of said first resonant coil located in said end region, and
    a contact area between said first support piece and said first resonant coil is smaller than a contact area between said second support piece and said first resonant coil.

4. The power reception device according to claim 2, wherein
    said vehicle-side support pieces are removably provided at said second support member.

5. The power reception device according to claim 2, wherein
    said second support member is cylindrically formed,
    the power reception device further comprising:
    a first path forming member made of resin, spaced apart from said first resonant coil, and forming a first cooling medium flow path for cooling said first resonant coil between said first path forming member and said circumferential surface of said second support member; and a cooling medium supply device for supplying a cooling medium to said first cooling medium flow path, wherein a thickness of said first path forming member is smaller than a thickness of said second support member.

6. The power reception device according to claim 5, wherein a distance between said first path forming member and said first resonant coil is shorter than a distance between said second support member and said first resonant coil.

7. The power reception device according to claim 1, wherein said vehicle-side resonant portion includes a first resonant coil formed by winding a first coil wire, said second support member includes a circumferential surface extending along said first resonant coil, the power reception device further comprising:

a first electromagnetic induction coil extending along said circumferential surface of said second support member, spaced apart from said first resonant coil, and being capable of receiving electric power from said first resonant coil by electromagnetic induction; and a third support member provided on said circumferential surface of said second support member and supporting said first electromagnetic induction coil, wherein one of said first support member and said third support member is provided to be relatively movable with respect to the other such that a spacing between said first resonant coil and said first electromagnetic induction coil can be adjusted.

8. The power reception device according to claim 1, wherein said first support member is made of fluorine resin.

9. The power reception device according to claim 1, wherein said vehicle-side resonant portion includes a first resonant coil formed by winding a first coil wire, said second support member is cylindrically formed and includes an inner circumferential surface extending along said first resonant coil, and said first resonant coil is arranged on the inner circumferential surface side of said second support member.

10. A power transmission device, comprising:

a facility-side resonant portion resonating, through an electromagnetic field, with a vehicle-side resonant portion mounted on a vehicle; and a facility-side support including a fourth support member supporting said facility-side resonant portion, and a fifth support member spaced apart from said facility-side resonant portion and supporting said fourth support member, wherein a dielectric tangent of said fourth support member is smaller than a dielectric tangent of said fifth support member.

11. The power transmission device according to claim 10, wherein said facility-side resonant portion includes a second resonant coil formed by winding a second coil wire, said fifth support member includes a circumferential surface extending along said second resonant coil, and said fourth support member includes a plurality of facility-side support pieces provided on said circumferential surface of said fifth support member, spaced apart from one another in a length direction of said second coil wire, and supporting said second resonant coil.

12. The power transmission device according to claim 11, wherein said second resonant coil includes an intermediate region including a central portion in the length direction of said second coil wire and a portion located around said central portion as well as an end region including an end of said second coil wire and a portion located around said end, said fourth support member includes a third support piece supporting a portion of said second resonant coil located in said intermediate region, and a fourth support piece supporting a portion of said second resonant coil located in said end region, and a contact area between said third support piece and said second resonant coil is smaller than a contact area between said fourth support piece and said second resonant coil.

13. The power transmission device according to claim 11, wherein said facility-side support pieces are removably provided at said fifth support member.

14. The power transmission device according to claim 11, wherein said fifth support member is cylindrically formed, the power transmission device further comprising:

a second path forming member made of resin, spaced apart from said second resonant coil, and forming a second cooling medium flow path for cooling said second resonant coil between said second path forming member and said circumferential surface of said fifth support member; and a cooling medium supply device for supplying a cooling medium to said second cooling medium flow path, wherein a thickness of said second path forming member is smaller than a thickness of said fifth support member.

15. The power transmission device according to claim 14, wherein a distance between said second path forming member and said second resonant coil is shorter than a distance between said fifth support member and said second resonant coil.

16. The power transmission device according to claim 10, wherein said facility-side resonant portion includes a second resonant coil formed by winding a second coil wire, said fifth support member includes a circumferential surface extending along said second resonant coil, the power transmission device further comprising:

a second electromagnetic induction coil extending along said circumferential surface of said fifth support member, spaced apart from said second resonant coil, and being capable of receiving electric power from said second resonant coil by electromagnetic induction; and a sixth support member provided on said circumferential surface of said fifth support member and supporting said second electromagnetic induction coil, wherein one of said fourth support member and said sixth support member is provided to be relatively movable with respect to the other such that a spacing between said second resonant coil and said second electromagnetic induction coil can be adjusted.

17. The power transmission device according to claim 10, wherein
said fourth support member is made of fluorine resin.

18. The power transmission device according to claim 10, wherein
said facility-side resonant portion includes a second resonant coil formed by winding a second coil wire,
said fifth support member is cylindrically formed and includes an inner circumferential surface extending along said second resonant coil, and
said second resonant coil is arranged on the inner circumferential surface side of said fifth support member.

19. A power transfer system, comprising:
a power transmission device including a facility-side resonant portion provided in a facility external to a vehicle, and a facility-side support supporting said facility-side resonant portion; and
a power reception device including a vehicle-side resonant portion mounted on the vehicle and resonating with said facility-side resonant portion through an electromagnetic field, and a vehicle-side support supporting said vehicle-side resonant portion, wherein
said vehicle-side support includes a first support member supporting said vehicle-side resonant portion, and a second support member spaced apart from said vehicle-side resonant portion and supporting said first support member,
said facility-side support includes a fourth support member supporting said facility-side resonant portion, and a fifth support member spaced apart from said facility-side resonant portion and supporting said fourth support member,
a dielectric tangent of said first support member is smaller than a dielectric tangent of said second support member, and
a dielectric tangent of said fourth support member is smaller than a dielectric tangent of said fifth support member.

* * * * *